United States Patent
Wu et al.

(10) Patent No.: US 7,978,270 B2
(45) Date of Patent: Jul. 12, 2011

(54) LIQUID CRYSTAL DISPLAY PANEL AND RELATED DEVICE FOR RECEIVING A TOUCH COMMAND

(75) Inventors: Jeng-Fang Wu, Hsin-Chu (TW); Yi-Pai Huang, Hsin-Chu (TW); Ting-Jui Chang, Hsin-Chu (TW); Wei-Lung Liao, Hsin-Chu (TW); Shui-Chih Lien, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 976 days.

(21) Appl. No.: 11/741,773

(22) Filed: Apr. 30, 2007

(65) Prior Publication Data

US 2008/0055502 A1   Mar. 6, 2008

(30) Foreign Application Priority Data

Sep. 4, 2006 (TW) .............................. 95132625 A

(51) Int. Cl.
*G02F 1/1335* (2006.01)
*G06F 3/041* (2006.01)
(52) U.S. Cl. ......................................... 349/12; 345/173
(58) Field of Classification Search .................... 349/12; 345/173, 174, 179; 439/8, 17, 348
See application file for complete search history.

(56) References Cited

U.S. PATENT DOCUMENTS

| | | | |
|---|---|---|---|
| 5,949,511 A * | 9/1999 | Park | 349/139 |
| 6,483,498 B1 | 11/2002 | Colgan et al. | |
| 6,501,529 B1 | 12/2002 | Kurihara | |
| 7,019,734 B2 | 3/2006 | Cross et al. | |
| 7,671,847 B2 * | 3/2010 | Weng | 345/173 |
| 2004/0169625 A1 | 9/2004 | Park et al. | |
| 2006/0017710 A1 | 1/2006 | Lee et al. | |
| 2006/0102462 A1 | 5/2006 | Bourdelais et al. | |
| 2006/0109222 A1 | 5/2006 | Lee | |

FOREIGN PATENT DOCUMENTS

| | | |
|---|---|---|
| CN | 1749819 A | 3/2006 |
| JP | 200175074 A | 3/2001 |
| JP | 2002287660 A | 10/2002 |
| JP | 2005267464 | 9/2005 |
| JP | 200640289 A | 2/2006 |
| JP | 2006133786 A | 5/2006 |
| JP | 2006154815 A | 6/2006 |
| TW | 200409033 | 6/2004 |
| TW | 200612139 | 4/2006 |
| WO | 2005043229 A1 | 5/2005 |

* cited by examiner

*Primary Examiner* — Mark A Robinson
*Assistant Examiner* — Robert Tavlykaev
(74) *Attorney, Agent, or Firm* — Winston Hsu; Scott Margo

(57) ABSTRACT

A liquid crystal display panel includes a first substrate, a second substrate, a first electrode, a second electrode, a third electrode, an isolating layer, and a conductor. The first electrode is disposed between the first substrate and the isolating layer, on which the conductor is disposed. Each of the second and third electrodes is disposed on the second substrate and includes a contact surface. The second and third electrodes are not in contact with each other and are separated by a gap. The conductor is disposed in accordance with the location of the gap.

8 Claims, 21 Drawing Sheets

LIQUID CRYSTAL DISPLAY PANEL AND RELATED DEVICE FOR RECEIVING A TOUCH COMMAND

BACKGROUND OF THE INVENTION

1. Field of the Invention

The present invention relates to a liquid crystal display device, and more particularly to a liquid crystal display device capable of receiving touch commands.

2. Description of the Prior Art

With rapid development in technology, massive amount of data can be transmitted, processed and stored in digital formats. Electronic devices capable of accessing digital data have thus become important tools in modern society. Notebook computers, mobile phones, and personal digital assistants (PDAs) are light and easy-to-carry portable electronic devices that allow users to search, read and store different types of digital data. Since portable electronic devices aim at light weight and thin appearance, there is usually insufficient space for traditional input devices such as keyboard or mouse. Instead, touch panels are commonly used for portable electronic devices as the human-machine interface for data transmission. When a user enters a touch command by pressing a touch panel, the touch panel can detect the location of the applied pressure (or the amount of the applied pressure) and control the operation of the portable device accordingly.

Liquid crystal display (LCD) panels are commonly used for display screens in portable electronic devices. Based on how input commands are identified, touch panels can be categorized into four major types: resistive, capacitive, surface wave and optical touch panels. Reference is made to FIG. 1 for a diagram of a prior art LCD device 10. The LCD device 10 includes an LCD panel 110 and a resistive touch panel 120. The resistive touch panel 120 and the LCD panel 110 are connected via an adhesion glue film 140. The LCD panel 110 includes a first substrate 112, a first electrode 114, a liquid crystal layer 115, a second electrode 116, and a second substrate 118. The resistive touch panel 120 includes a substrate 122, a lower transparent conducting film 124, a plurality of dot spacers 125, an upper transparent conducting film 126, a connecting layer 127, a polyethylene terephthalate (PET) layer 128, and a trace 130. The connecting layer 127 is disposed between the upper transparent conducting film 126 and the lower transparent conducting film 124, and the dot spacers 125 are disposed in a matrix manner within the space between the upper transparent conducting film 126 and the lower transparent conducting film 124. When a user applies a pressure on the PET layer 128 using a finger, a pen or other input devices, the upper transparent conducting film 126 and the lower transparent conducting film 124 will make contact with each other at the exact point of the applied pressure, thereby generating a corresponding voltage. The voltage is then transmitted to a central processor (not shown in FIG. 1) via the trace 130 for identifying the touch command entered by the user. Since the resistive touch panel 120 and the LCD panel 110 are connected via the adhesion glue film 140, the prior art LCD device 10 required many stacks of different layers, resulting in higher manufacturing costs, larger size and heavier weight. Optical performances such as brightness or contrast of the prior art LCD device 10 will also be influenced.

Reference is made to FIG. 2 for a diagram of an LCD device 20 disclosed in U.S. Patent Publication No. US2006/0017710. The LCD device 20 includes a plurality of data lines, a plurality of gate lines, a plurality of sensor signal lines, and a plurality of pixels. For ease of explanation, only a data line DL, a gate line GL, sensor signal lines Pj, Si, Psd, and a pixel PX are illustrated in FIG. 2. The pixel PX includes a display unit DC and a detecting unit DC. The display unit DC, coupled to the data line DL and the gate line GL, includes a thin film transistor (TFT) switch TFT1, a liquid crystal capacitor $C_{LC}$ and a storage capacitor $C_{ST}$. The detecting unit SC, coupled to the sensor signal lines Pj, Si and Psd, includes a thin film transistor switch TFT2, a thin film transistor switch TFT3, and a variable capacitor $C_V$. In the LCD device 20, when a user enters a touch command, the applied force changes the capacitance of the variable capacitor $C_V$, thereby changing the gate voltage of the thin film transistor TFT3. After the thin film transistor TFT3 is turned on, signals corresponding to trails of the touch command can be transmitted to a central processor (not shown in FIG. 2) via the turned-on thin film transistor TFT3 and the sensor signal line Psd for identifying the touch command. In the prior art LCD device 20, the capacitance of the variable capacitor $C_V$ depends on the amount of force from the user when entering the touch command. Since the gate voltage of the thin film transistor TFT3 cannot be controlled directly, residual charges may blur the signals corresponding to the touch command, and the ability to identify different touch commands accurately is thus influenced.

Reference is made to FIG. 3 for a diagram of an LCD device 30 disclosed in U.S. Patent Publication No. US2004/0169625. The LCD device 30 includes a first substrate 112, a first electrode 114, a liquid crystal layer 115, a second electrode 116, and a second substrate 118. The second electrode 116 is disposed on the second substrate 118 and includes a plurality of pixels PX. A plurality of photo diodes PD are also disposed on the second substrate 118 for sensing input signals given by a user using a light source 150 (such as an optical pen). Optical signals detected by the photo diodes PD can then be transmitted to a central processor (not shown in FIG. 3) for identifying commands given by the user using the light source 150. The prior art LCD device 30 can detect input signals from external light source using the photo diodes PD, but is unable to identify input signals corresponding to touch commands.

SUMMARY OF THE INVENTION

The present invention provides an LCD panel comprising a first substrate; a second substrate in parallel with the first substrate and facing the first substrate; a first electrode disposed on the first substrate; a first isolating layer disposed on the first electrode; a second electrode disposed on the second substrate and including a first region and a second region; a third electrode disposed on the second substrate and including a third region and a fourth region, wherein the second region of the second electrode and the third region of the third electrode is separated by a gap; a second isolating layer disposed on the first region of the second electrode and on the fourth region of the third electrode; and a conductor disposed on the first isolating layer at a region corresponding to the gap.

The present invention also provides an LCD panel comprising a first substrate; a second substrate in parallel with the first substrate and facing the first substrate; a first electrode disposed on the first substrate; a conductor disposed on the first electrode; a first isolating layer disposed on the first electrode at a region excluding where the conductor is disposed; a second electrode disposed on the second substrate at a region corresponding to the conductor and including a first region and a second region, wherein the conductor is in contact with the first region of the second electrode when the first and second substrates are moved towards each other due to an applied force; and a second isolating layer disposed on the second region of the second electrode.

The present invention also provides an LCD panel which comprises a first substrate; a second substrate in parallel with the first substrate and facing the first substrate; a first electrode disposed on the first substrate; a conductor disposed on the first electrode and having a protrusive structure; a first isolating layer disposed on the first electrode at a region excluding the protrusive structure; a second electrode disposed on the second substrate at a region corresponding to the protrusive structure of the conductor and including a first region and a second region, wherein the protrusive structure of the conductor is in contact with the first region of the second electrode when the first and second substrates are moved towards each other due to an applied force; and a second isolating layer disposed on the second region of the second electrode.

The present invention also provides an LCD device comprising an LCD panel and a signal processing circuit. The LCD panel comprises a plurality of data lines for transmitting data signals corresponding to display images; a plurality of gate lines for transmitting scan signals; a first sensor signal line coupled to a first bias voltage; a second sensor signal line coupled to a second bias voltage; a display unit coupled to a corresponding data line and a corresponding gate line for displaying images based on scan signals and data signals respectively received from the corresponding gate line and the corresponding data line; and a detecting unit coupled to the second sensor signal line, wherein the detecting unit is electrically connected to the first sensor signal line or electrically isolated from the first sensor signal line based on a touch command, The signal processing circuit is coupled to the second sensor signal line for outputting corresponding output signals when output signals of the second sensor signal line vary.

The present invention also provides an LCD device comprising an LCD panel and a signal processing circuit. The LCD panel comprises a plurality of data lines for transmitting data signals corresponding to display images; a plurality of gate lines for transmitting scan signals; a sensor signal line; a display unit coupled to a corresponding data line and a corresponding gate line for displaying images based on scan signals and data signals respectively received from the corresponding gate line and the corresponding data line; and a detecting unit coupled to the sensor signal line based on a touch command. The signal processing circuit is coupled to the sensor signal line for outputting corresponding output signals when output signals of the sensor signal line vary.

These and other objectives of the present invention will become apparent to those of ordinary skill in the art after reading the following detailed description with respect to the preferred embodiments that are illustrated in the various figures and drawings.

DETAILED DESCRIPTION

Figure 1:
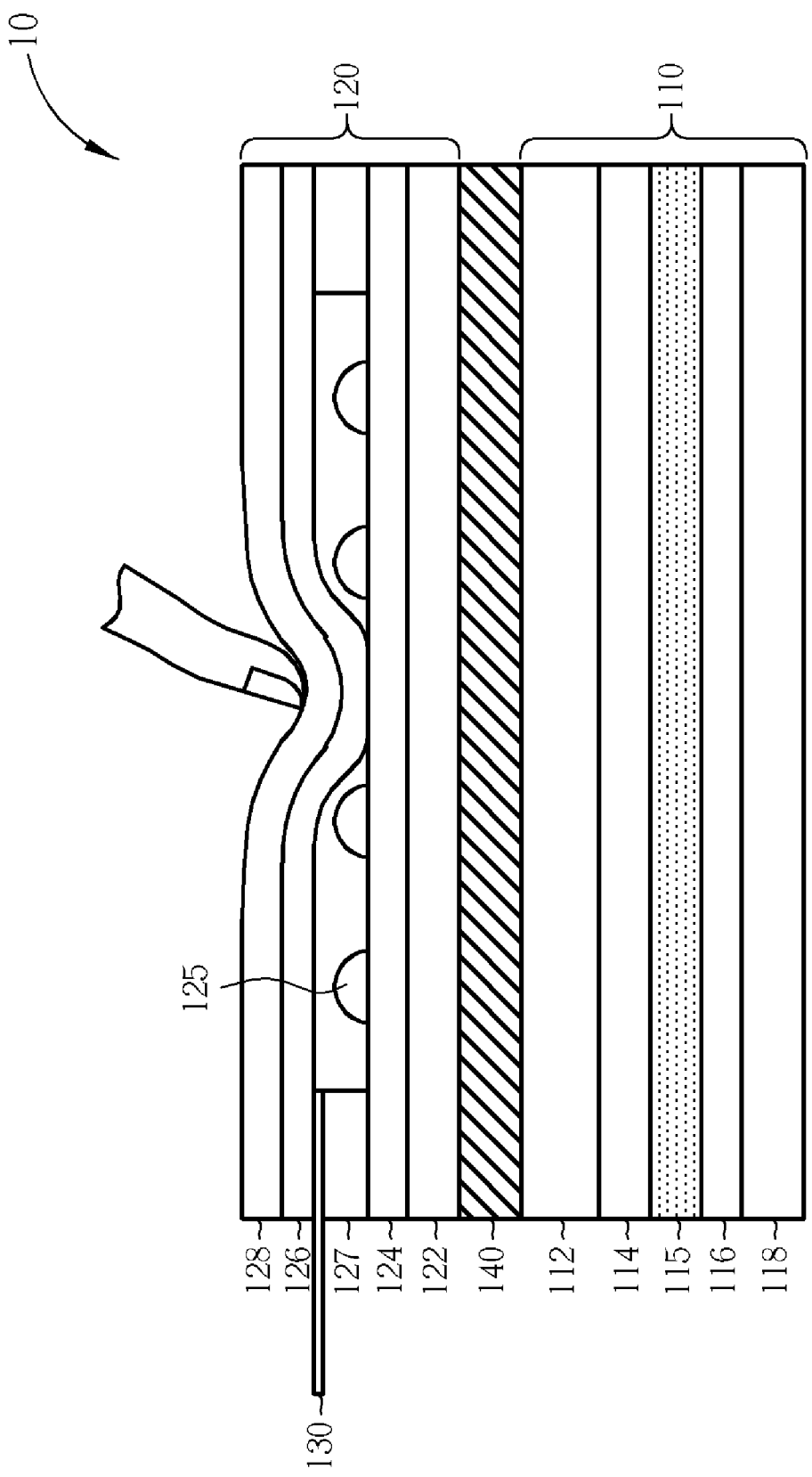
FIG. 1 is a diagram of a prior art LCD device.
Figure 2:
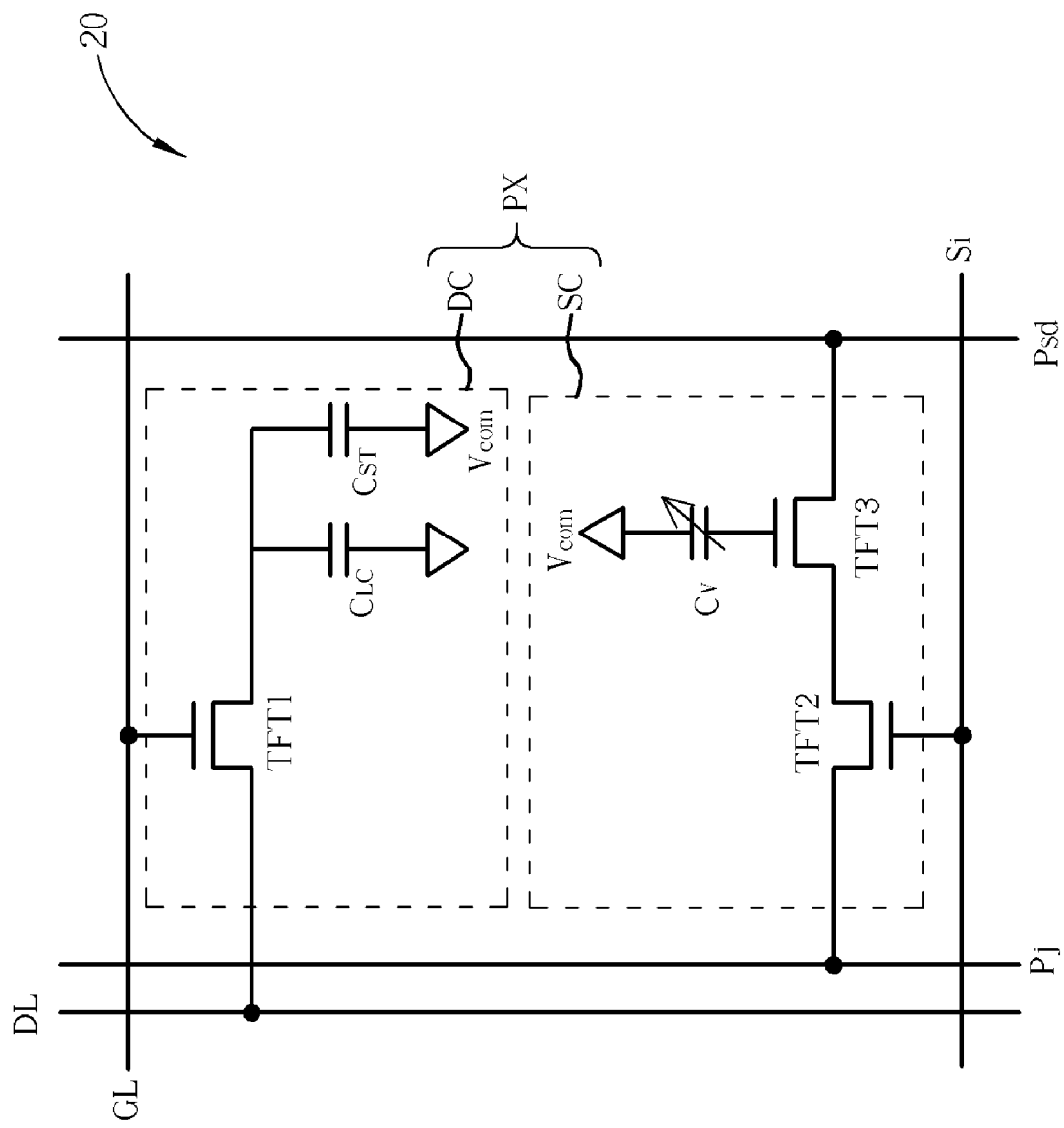
FIG. 2 is a diagram of another prior art LCD device.
Figure 3:
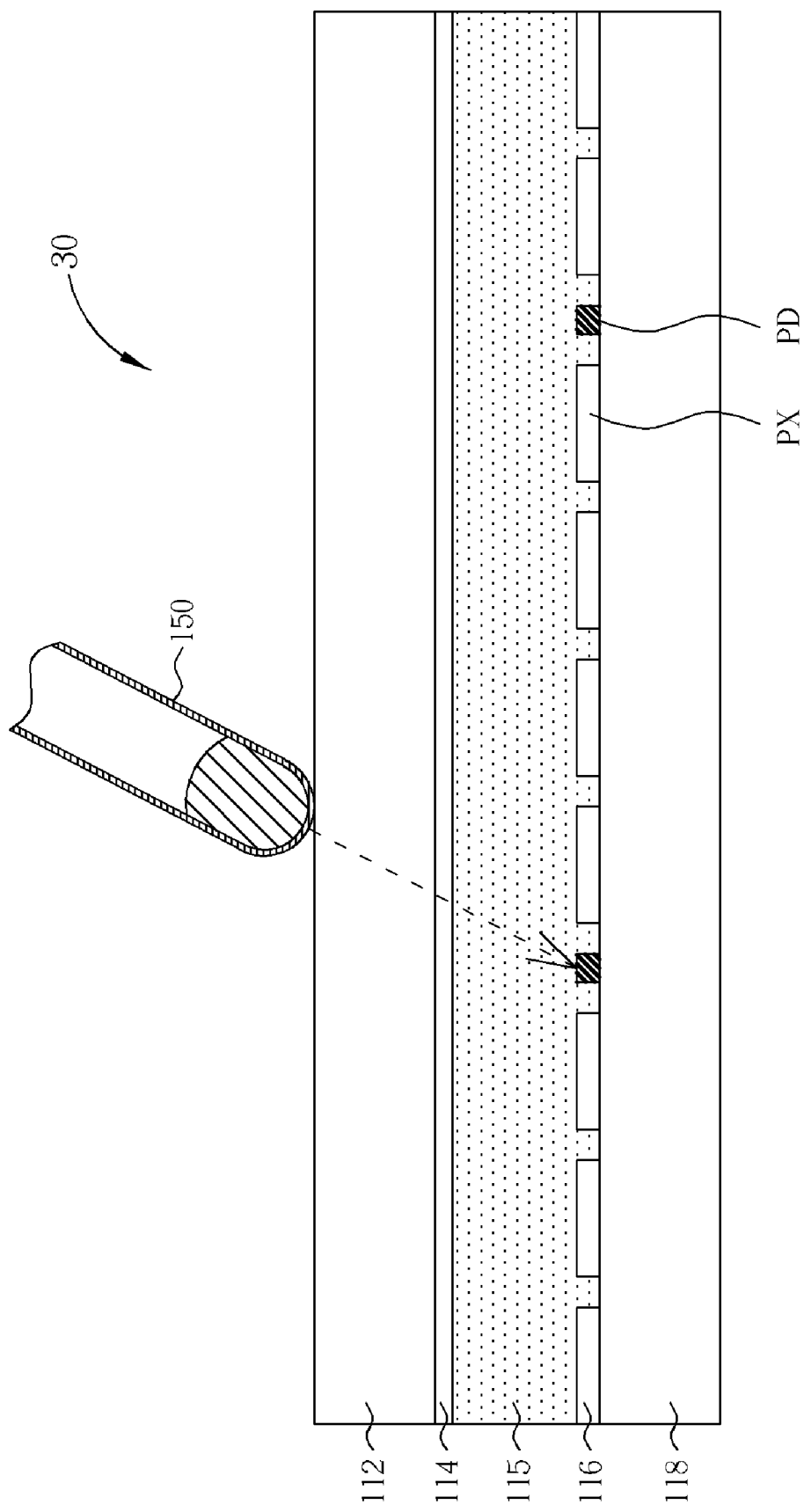
FIG. 3 is a diagram of another prior art LCD device.
Figure 4:
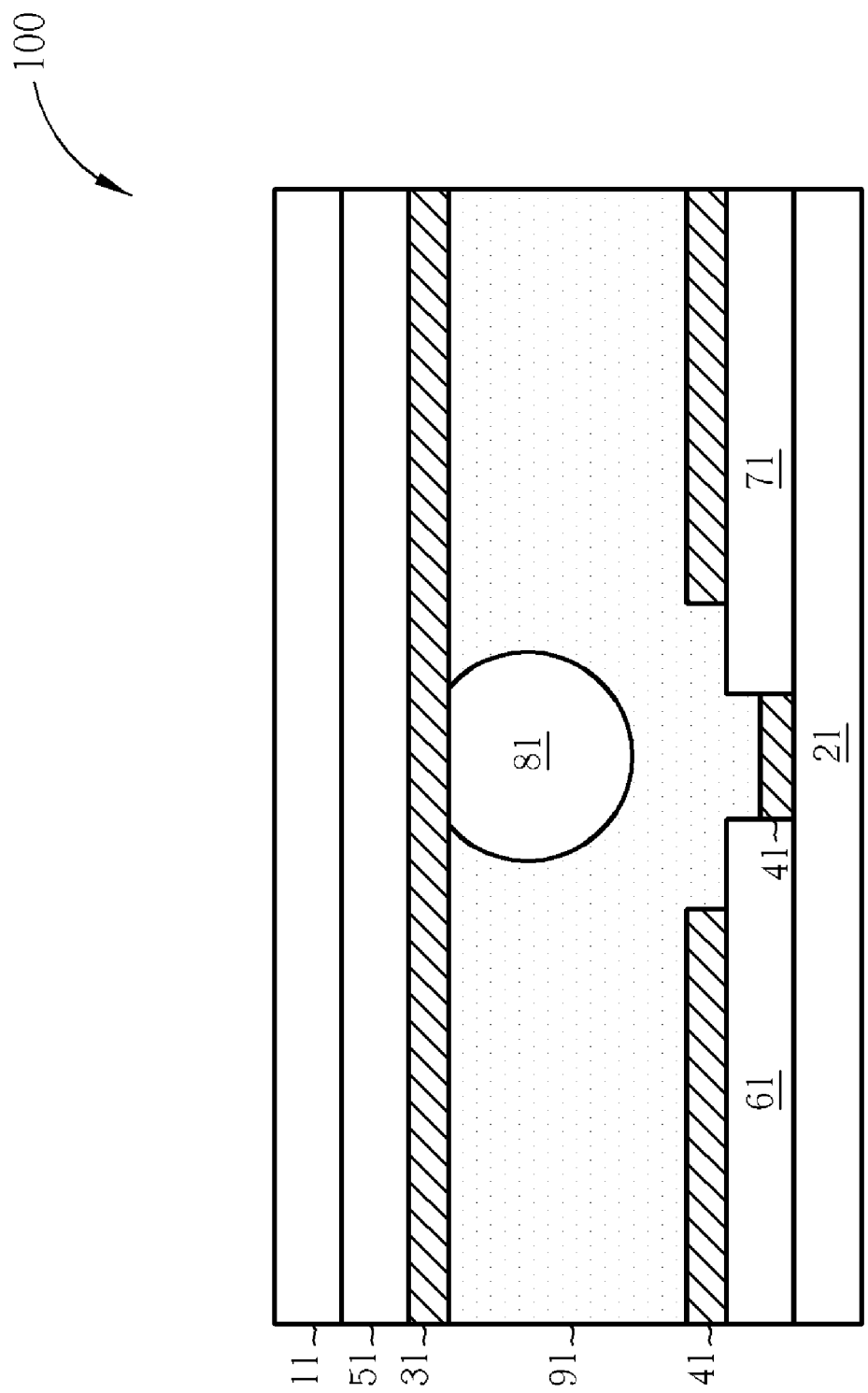
FIG. 4 is a cross-sectional diagram of an LCD device according to a first embodiment of the present invention when not receiving touch commands.
Figure 5:
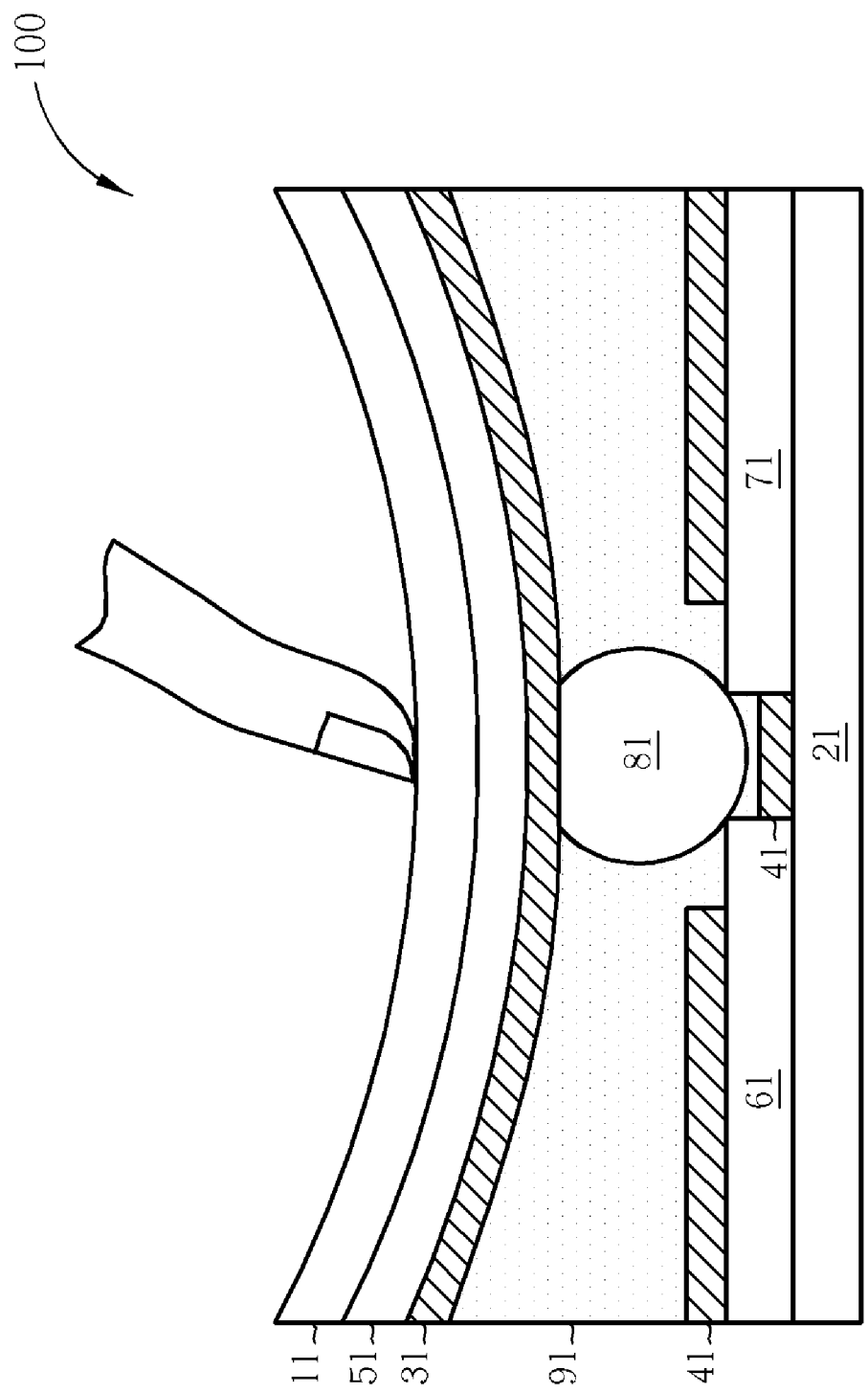
FIG. 5 is a cross-sectional diagram of an LCD device according to the first embodiment of the present invention when receiving touch commands.

References are made to FIGS. 4 and 5. FIG. 4 is a cross-sectional diagram illustrating an LCD device 100 according to a first embodiment of the present invention when not receiving touch commands. FIG. 5 is a cross-sectional diagram illustrating the LCD device 100 when receiving touch commands. The LCD device 100 includes a first substrate 11, a second substrate 21, a first isolating layer 31, a second isolating layer 41, a first electrode 51, a second electrode 61, a third electrode 71, a conductor 81, and a liquid crystal layer 91. The liquid crystal layer 91, disposed between the first substrate 11 and the second substrate 21, can provide incident light with various degrees of transmission and refraction by rotating liquid crystal molecules in accordance with applied voltages, thereby displaying images of different gray scales. The first electrode 51, disposed on the first substrate 11, can be used as a common electrode capable of receiving the common voltage required for operating the LCD device 100. The conductor 81 and the first electrode 51 are electrically isolated from each other due to the first isolating layer 31 disposed between the conductor 81 and the first electrode 51. The second electrode 61 and the third electrode 71, both disposed on the second substrate 21, are not in contact with each other and are separated by a gap. The center of the gap corresponds to the center of the conductor 81 disposed on the first substrate 11. The second isolating layer 41 is disposed on predetermined regions of the second electrode 61 and the third electrode 71, and on the second substrate 21 at a region corresponding to the gap. Near the gap, the second electrode 61 and the third electrode 71 include exposed regions where the second isolating layer 41 is not disposed. In other words, the predetermined region of the second electrode 61 and the liquid crystal layer 91 are separated by the second isolating layer 41, while the exposed region of the second electrode 61 is in direct contact with the liquid crystal layer 91. Similarly, the predetermined region of the third electrode 71 and the liquid crystal layer 91 are separated by the second isolating layer 41, while the exposed region of the third electrode 71 is in direct contact with the liquid crystal layer 91. The conductor 81 of the LCD device 100 can include a ball-shaped conductor composed of gold (Ag) or copper (Au), as well as conductors of various shapes and composed of other conductive materials. The first electrode 51, the second electrode 61 and the third electrode 71 can include indium tin oxide (ITO) or other types of conductive materials.

When no touch command is applied for giving instructions or entering data, the second electrode 61 and the third electrode 71 of the LCD device 100 are electrically isolated from each other, as illustrated in FIG. 4. When the user gives instructions or enters data with a touch command, a force is applied to the first substrate 11. The distance between the first substrate 11 and the second substrate 21 is gradually shortened until the conductor 81 is in contact with the exposed regions of the second electrode 61 and the third electrode 71 simultaneously. Therefore, the second electrode 61 and the third electrode 71 of the LCD device 100 are electrically connected to each other via the conductor 81, as illustrated in FIG. 5.

Figure 6:
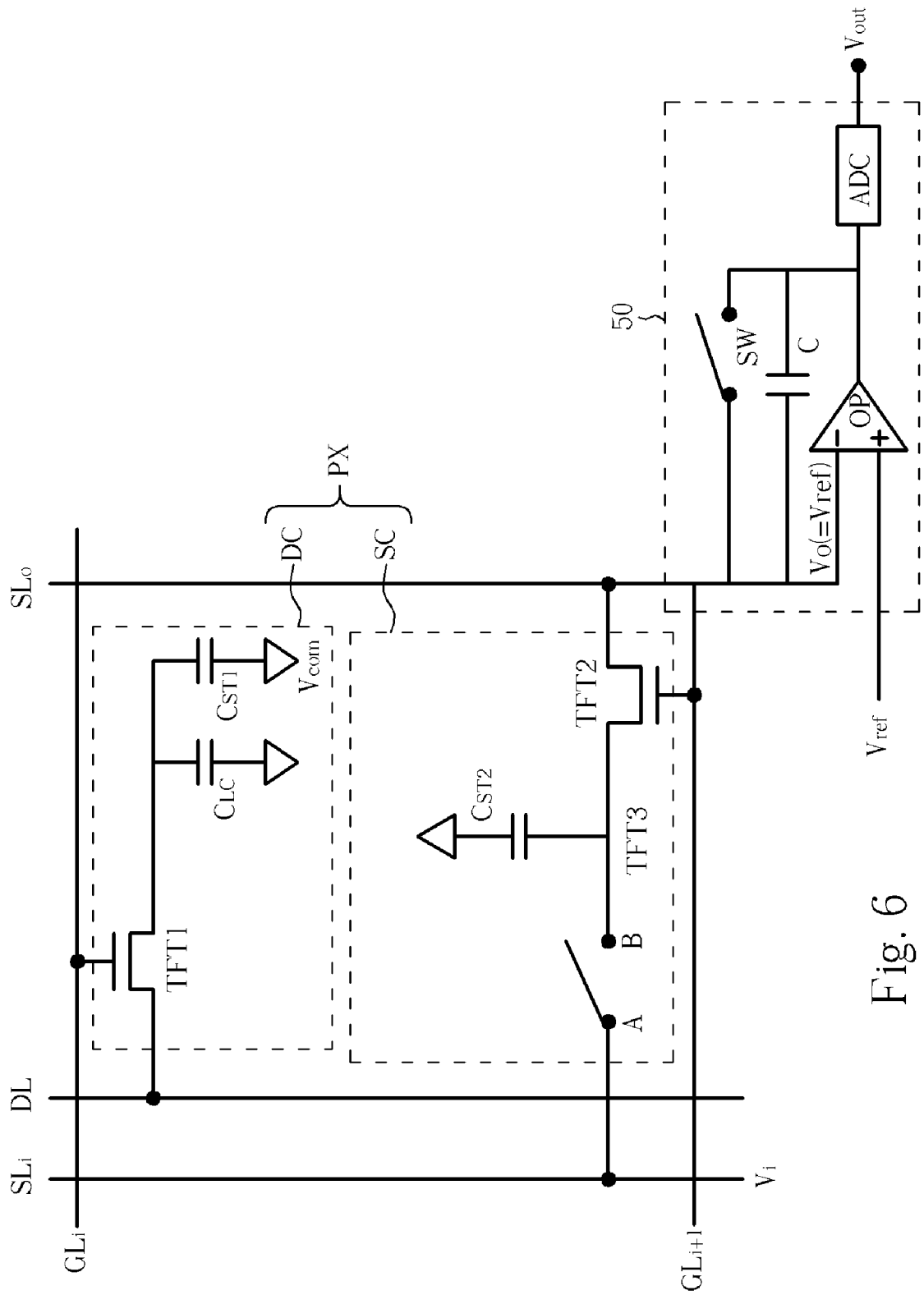
FIG. 6 is an equivalent circuit diagram of the LCD device in FIG. 4.
Figure 7:
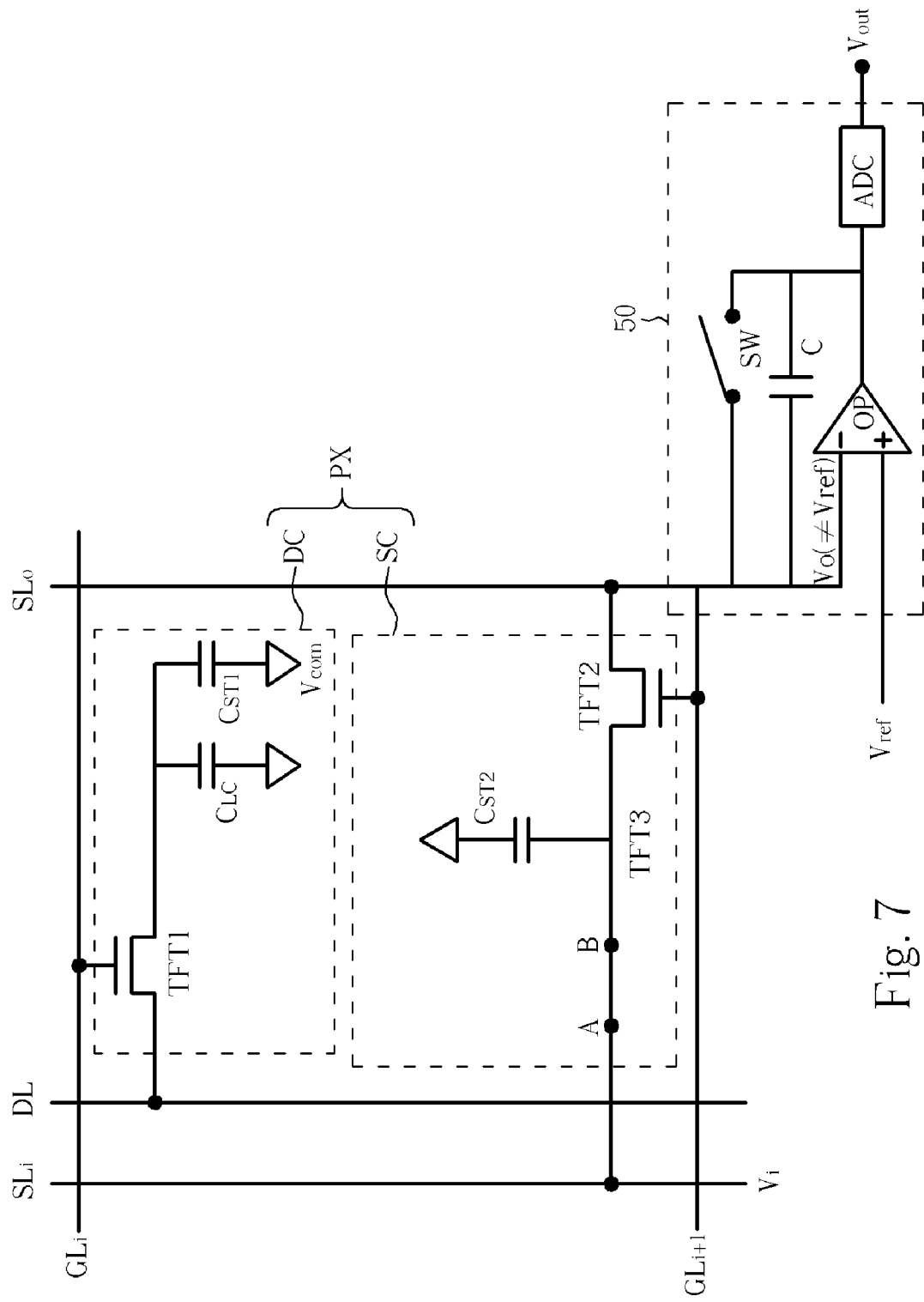
FIG. 7 is an equivalent circuit diagram of the LCD device in FIG. 5.

References are made to FIGS. 6 and 7. FIG. 6 is an equivalent circuit diagram of the LCD device 100 according to the first embodiment of the present invention when not receiving touch commands (corresponding to FIG. 4). FIG. 5 is an equivalent circuit diagram of the LCD device 100 when receiving touch commands (corresponding to FIG. 5). A pixel PX of the LCD device 100 is used for illustrating the present invention in FIGS. 6 and 7. The pixel PX includes a display unit DC and a detecting unit DC. The display unit DC, coupled to a corresponding data line DL and a corresponding gate line $GL_j$, includes a thin film transistor switch TFT1, a liquid crystal capacitor $C_{LC}$ and a storage capacitor $C_{ST1}$. The detecting unit SC, coupled to corresponding sensor signal lines $SL_i$ and $SL_o$, includes a thin film transistor switch TFT2 and a storage capacitor $C_{ST2}$. A node A corresponds to the exposed region of the second electrode 61, and a node B corresponds to the exposed region of the third electrode 71. In the LCD device 100, the sensor signal line SL is coupled to a voltage Vi, and the sensor signal line $SL_o$ is coupled to a voltage Vref. The LCD device illustrated in FIGS. 6 and 7 further includes a signal processing circuit 50 such as an integrating circuit. For example, the signal processing circuit 50, including devices such as an operational amplifier OP, a capacitor C, a reset switch SW, and an analog-to-digital converter ADC, can generate an output voltage Vout based on the voltages Vo and Vref.

When no touch command is applied, the second electrode 61 and the third electrode 71 are electrically isolated (as illustrated in FIG. 4), and the corresponding equivalent circuit diagram of the LCD device 100 is illustrated in FIG. 6. Since the node A and the node B are open-circuited, the voltage Vi cannot be transmitted to the storage capacitor $C_{ST2}$. When the thin film transistor switch TFT2 is turned on, the level of the storage capacitor $C_{ST2}$ is kept at the voltage level of Vref. Under these circumstances, signals received at the two input ends of the operational amplifier OP have the same voltage level (Vo=Vref), and the signal processing 50 will not detect any variation in current. When a touch command is applied, the second electrode 61 and the third electrode 71 are electrically connected to each other via the conductor 81 (as illustrated in FIG. 5), and the corresponding equivalent circuit diagram of the LCD device 100 is illustrated in FIG. 7. Since the node A and the node B are short-circuited, the voltage Vi can be transmitted to the storage capacitor $C_{ST2}$, thereby changing the level of the storage capacitor $C_{ST2}$. When the thin film transistor switch TFT2 is turned on, the level of the storage capacitor $C_{ST2}$ also varies. Under these circumstances, signals received at the two input ends of the operational amplifier OP have different voltage levels (Vo≠Vref), and the signal processing circuit 50 can measure current variations due to the touch command based on the voltage difference.

Figure 8:
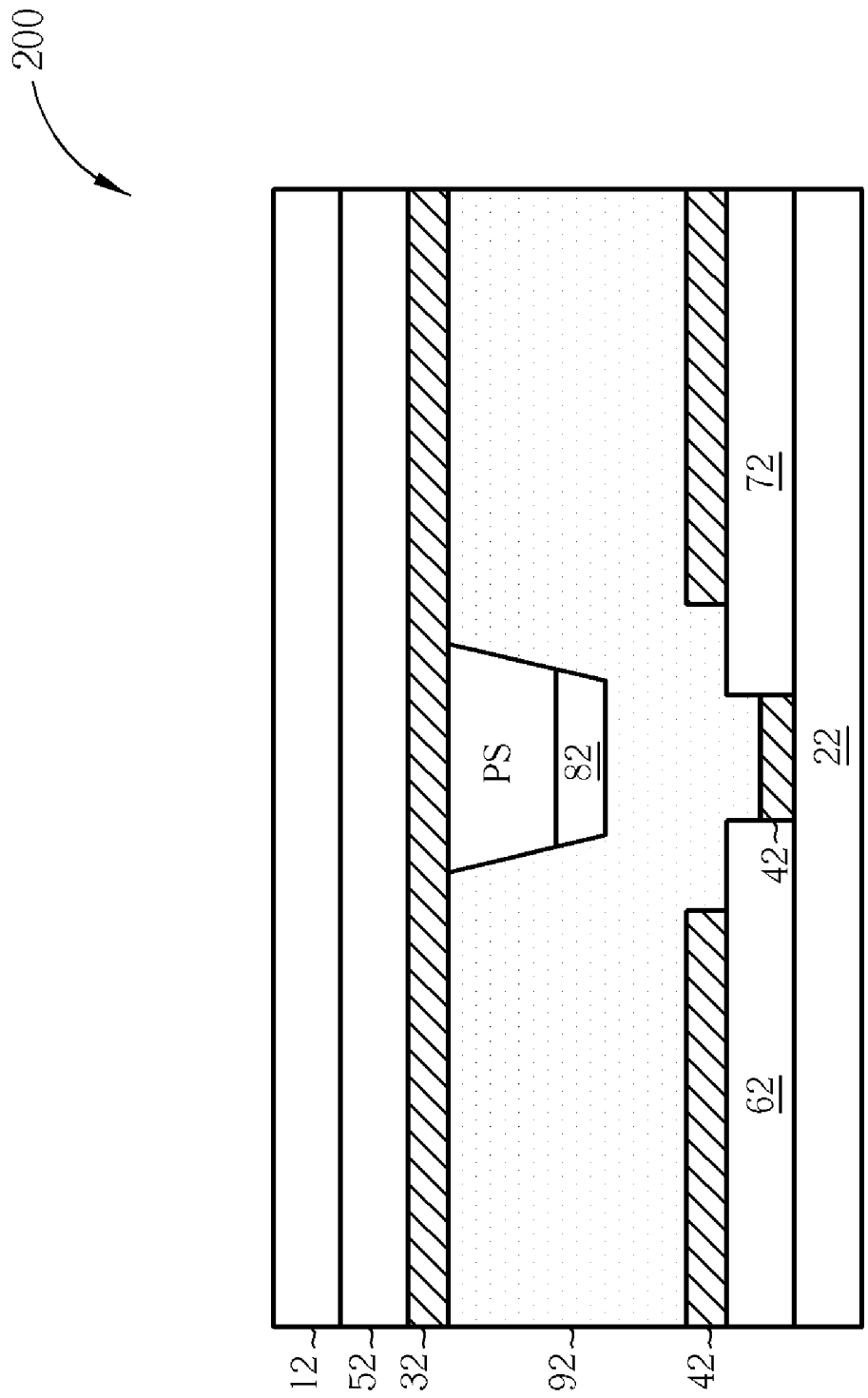
FIG. 8 is a cross-sectional diagram of an LCD device according to a second embodiment of the present invention when not receiving touch commands.
Figure 9:
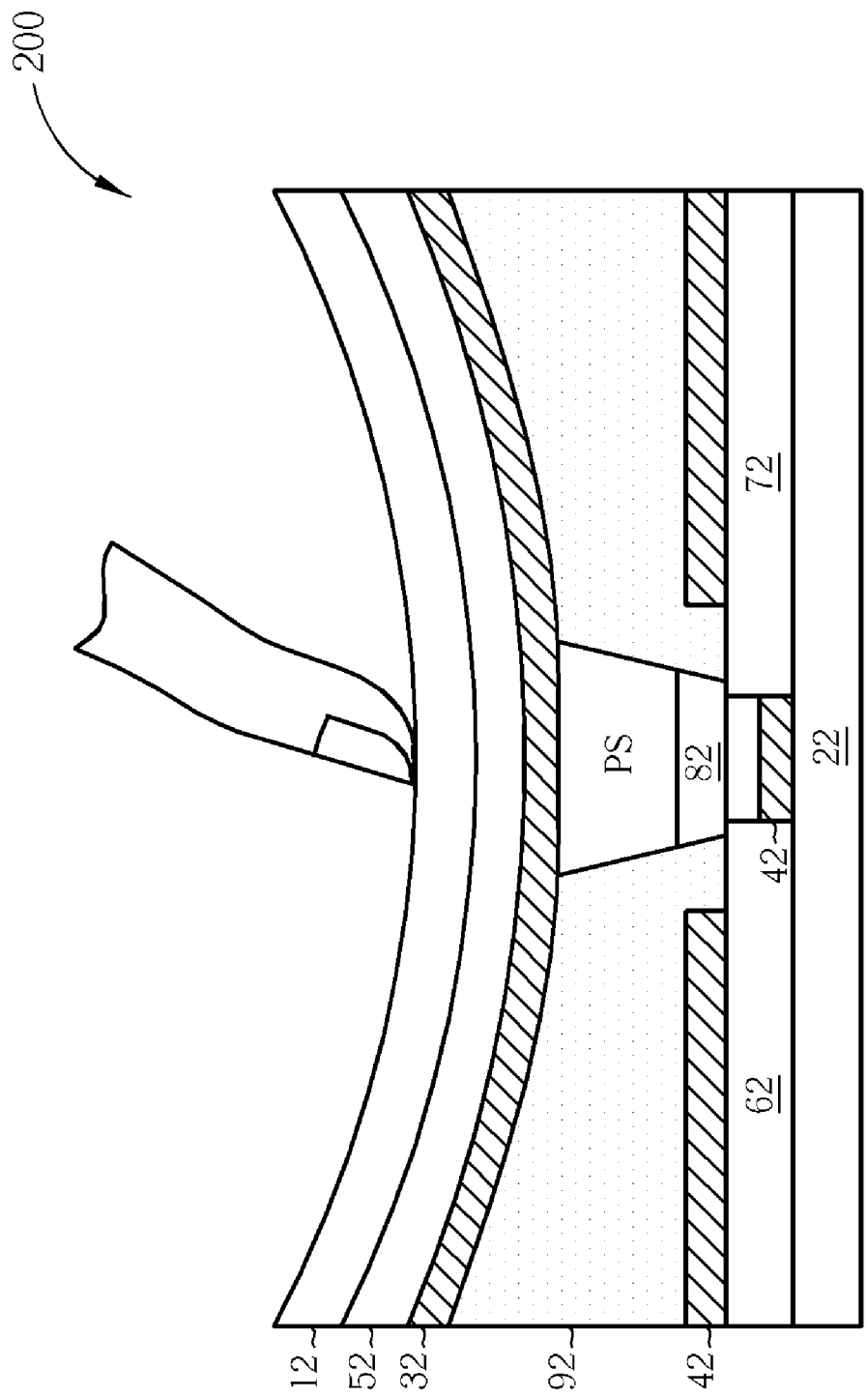
FIG. 9 is a cross-sectional diagram of an LCD device according to the second embodiment of the present invention when receiving touch commands.

References are made to FIGS. 8 and 9. FIG. 8 is a cross-sectional diagram illustrating an LCD device 200 according to a second embodiment of the present invention when not receiving touch commands. FIG. 9 is a cross-sectional diagram illustrating the LCD device 200 when receiving touch commands. The LCD device 200 includes a first substrate 12, a second substrate 22, a first isolating layer 32, a second isolating layer 42, a first electrode 52, a second electrode 62, a third electrode 72, a protrusion PS, and a liquid crystal layer 92. The liquid crystal layer 92, disposed between the first substrate 12 and the second substrate 22, can provide incident light with various degrees of transmission and refraction by rotating liquid crystal molecules in accordance with applied voltages, thereby displaying images of different gray scales. The first electrode 52, disposed on the first substrate 12, can be used as a common electrode capable of receiving the common voltage required for operating the LCD device 200. The protrusion PS and the first electrode 52 are electrically isolated from each other due to the first isolating layer 32 disposed between the protrusion PS and the first electrode 52. The protrusion PS includes light-blocking materials and can prevent light leak between the pixels of the LCD device 200. In the second embodiment of the present invention, a conductor 82 is further disposed on the protrusion PS. The second electrode 62 and the third electrode 72, both disposed on the second substrate 22, are not in contact with each other and are separated by a gap. The center of the gap corresponds to the center of the conductor 82 disposed on the protrusion PS. The second isolating layer 42 is disposed on predetermined regions of the second electrode 62 and the third electrode 72, and on the second substrate 22 at a region corresponding to the gap. Near the gap, the second electrode 62 and the third electrode 72 include exposed regions where the second isolating layer 42 is not disposed. In other words, the predetermined region of the second electrode 62 and the liquid crystal 92 are separated by the second isolating layer 42, while the exposed region of the second electrode 62 is in direct contact with the liquid crystal layer 92. Similarly, the predetermined region of the third electrode 72 and the liquid crystal 92 are separated by the second isolating layer 42, while the exposed region of the third electrode 72 is in direct contact with the liquid crystal layer 92.

When no touch command is applied for giving instructions or entering data, the second electrode 62 and the third electrode 72 of the LCD device 200 are electrically isolated from each other, as illustrated in FIG. 8. In this case, the equivalent circuit diagram of the LCD device 200 is also illustrated in FIG. 6. When the user gives instructions or enters data with a touch command, a force is applied to the first substrate 12.

The distance between the first substrate 12 and the second substrate 22 is gradually shortened until the conductor 82 on the protrusion PS is in contact with the exposed regions of the second electrode 62 and the third electrode 72 simultaneously. Therefore, the second electrode 62 and the third electrode 72 of the LCD device 200 are electrically connected to each other via the conductor 82, as illustrated in FIG. 9. In this case, the equivalent circuit diagram of the LCD device 200 is illustrated in FIG. 7.

Figure 10:
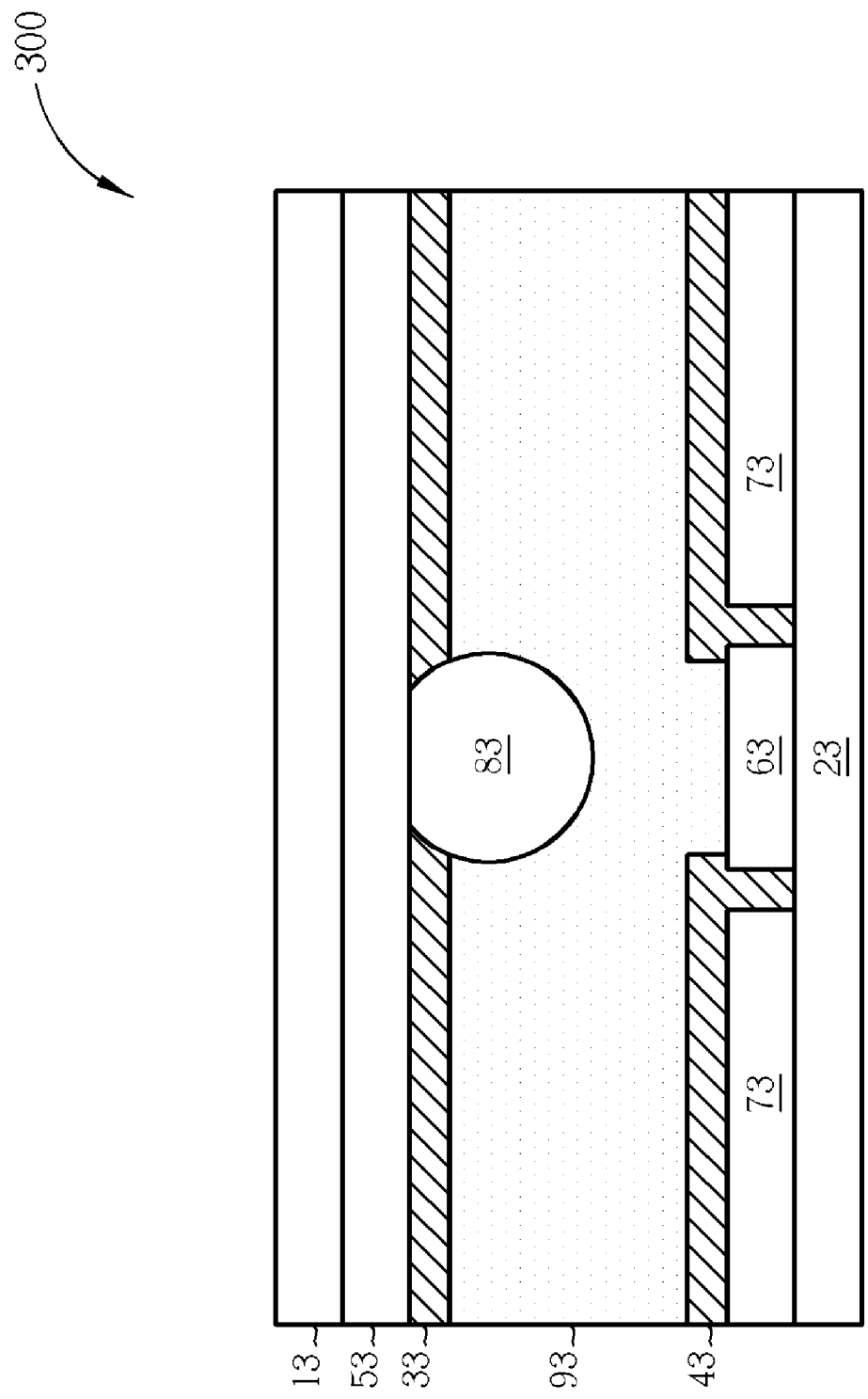
FIG. 10 is a cross-sectional diagram of an LCD device according to a third embodiment of the present invention when not receiving touch commands.
Figure 11:
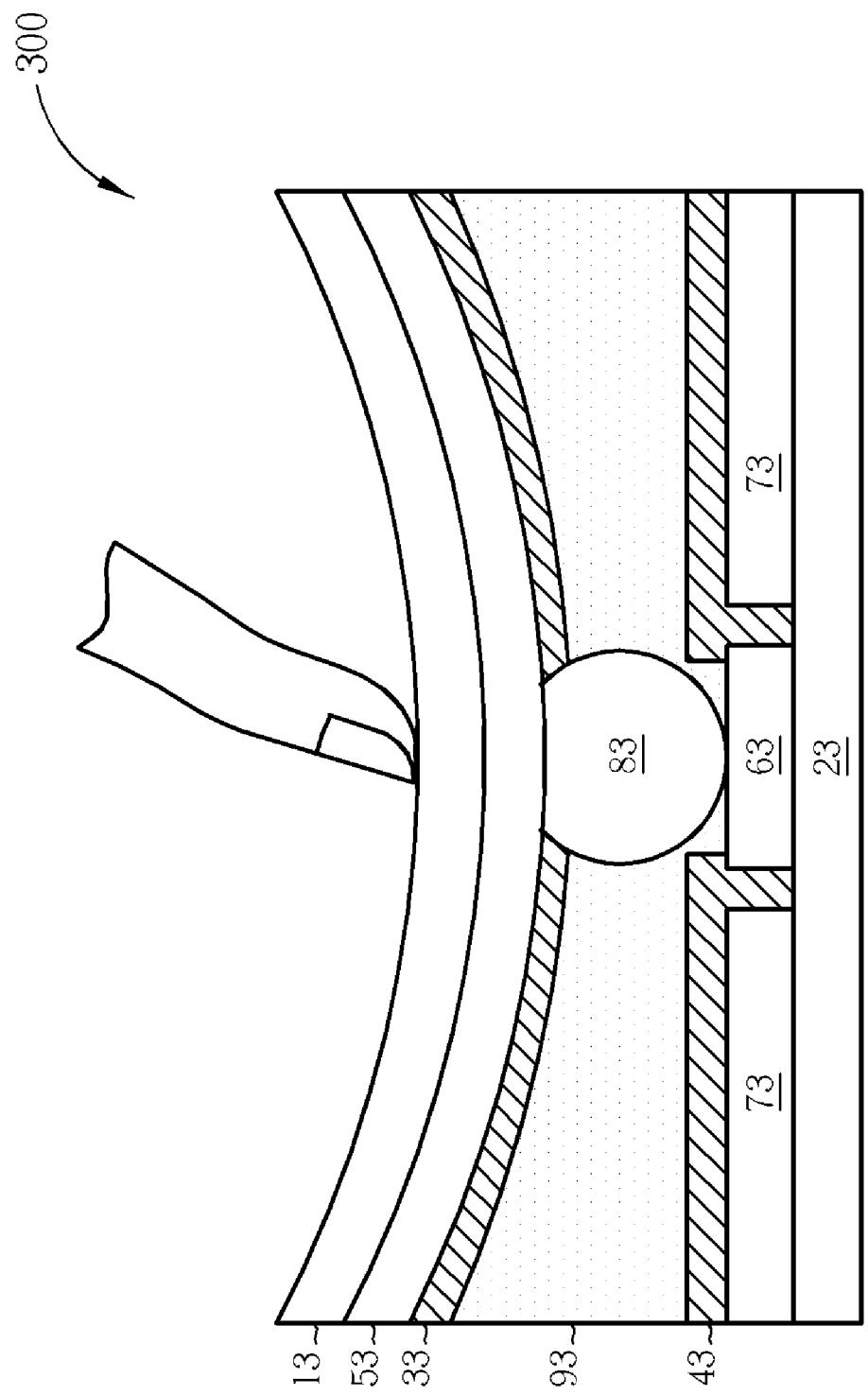
FIG. 11 is a cross-sectional diagram of an LCD device according to the third embodiment of the present invention when receiving touch commands.

References are made to FIGS. 10 and 11. FIG. 10 is a cross-sectional diagram illustrating an LCD device 300 according to a third embodiment of the present invention without receiving touch commands. FIG. 11 is a cross-sectional diagram illustrating the LCD device 300 when receiving touch commands. The LCD device 300 includes a first substrate 13, a second substrate 23, a first isolating layer 33, a second isolating layer 43, a first electrode 53, a second electrode 63, a third electrode 73, a conductor 83, and a liquid crystal layer 93. In the LCD device 100 according to the first embodiment of the present invention, as shown in FIG. 4, the first isolating layer 31 is disposed between the conductor 81 and the first electrode 51. Thus, the conductor 81 and the first electrode 51 are electrically isolated. In the LCD device 300 according to the third embodiment of the present invention, as shown in FIG. 10, the conductor 83 is disposed on the first electrode 53 directly. Thus, the voltage levels of the conductor 81 and the first electrode 53 are both equal to the common voltage. Also, the second electrode 63, having a contact surface, is disposed on the second substrate 23 at a region corresponding to the conductor 83. The third electrode 73, also disposed on the second substrate 22, is not in contact with the second electrode 63. The first isolating layer 33 is disposed on the first electrode 53 at regions where the conductor 83 is not disposed. The second isolating layer 43 is disposed on the third electrode 73, as well as on the second electrode 63 at regions excluding the contact surface. The conductor 83 of the LCD device 300 can include a ball-shaped conductor composed of gold or copper, as well as conductors of various shapes and composed of other conductive materials. The first electrode 53, the second electrode 63 and the third electrode 73 can include ITO or other types of conductive materials.

When no touch command is applied for giving instructions or entering data, the conductor 83 of the LCD device 300 and the second electrode 63 are electrically isolated from each other, as illustrated in FIG. 10. When the user gives instructions or enters data with a touch command, a force is applied to the first substrate 13. The distance between the first substrate 13 and the second substrate 23 is gradually shortened until the conductor 83 is in contact with the contact surface of the second electrode 63. Therefore, the first electrode 53 and the second electrode 63 are electrically connected to each other via the conductor 83, as illustrated in FIG. 11.

Figure 12:
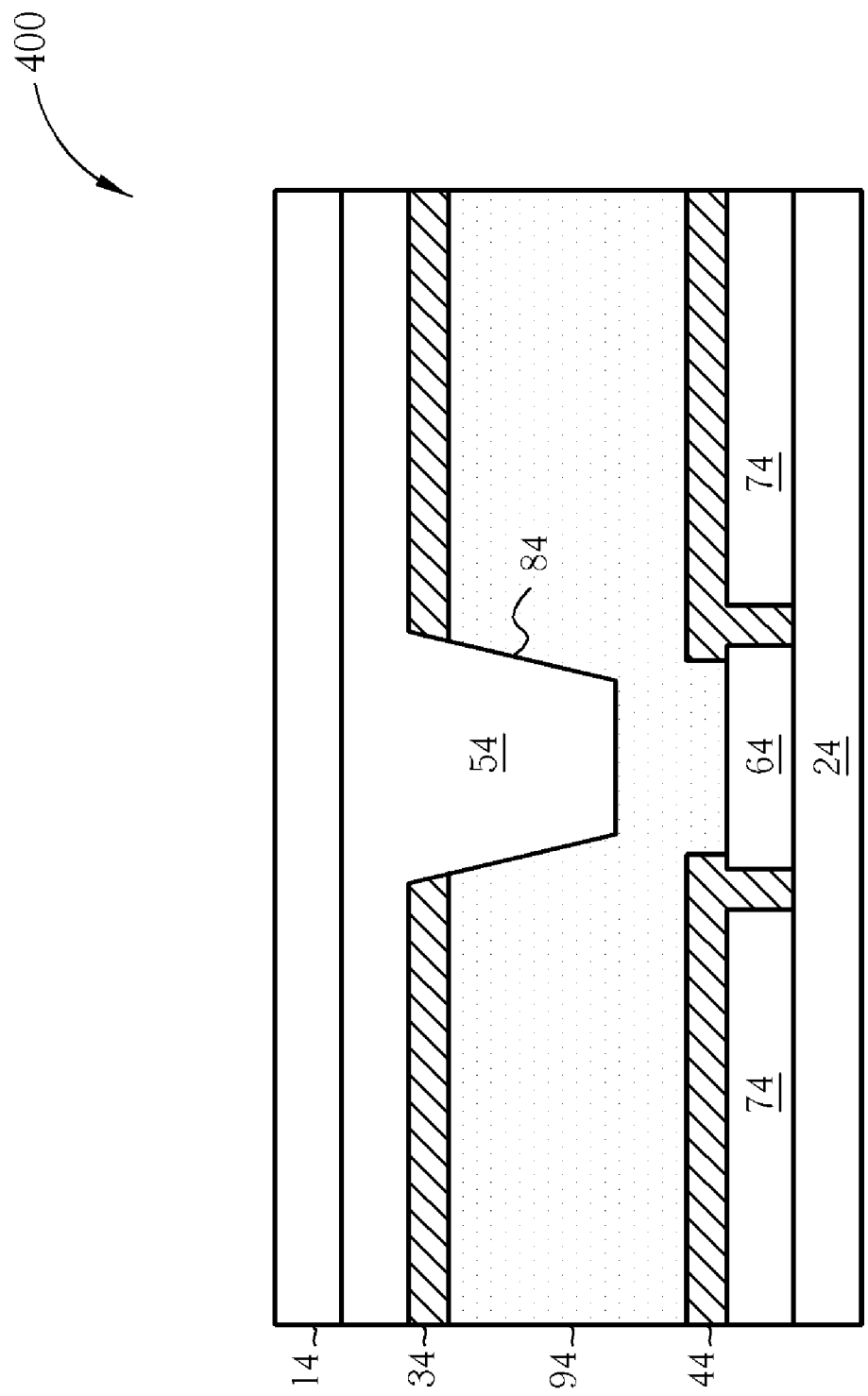
FIG. 12 is a cross-sectional diagram of an LCD device according to a fourth embodiment of the present invention when not receiving touch commands.
Figure 13:
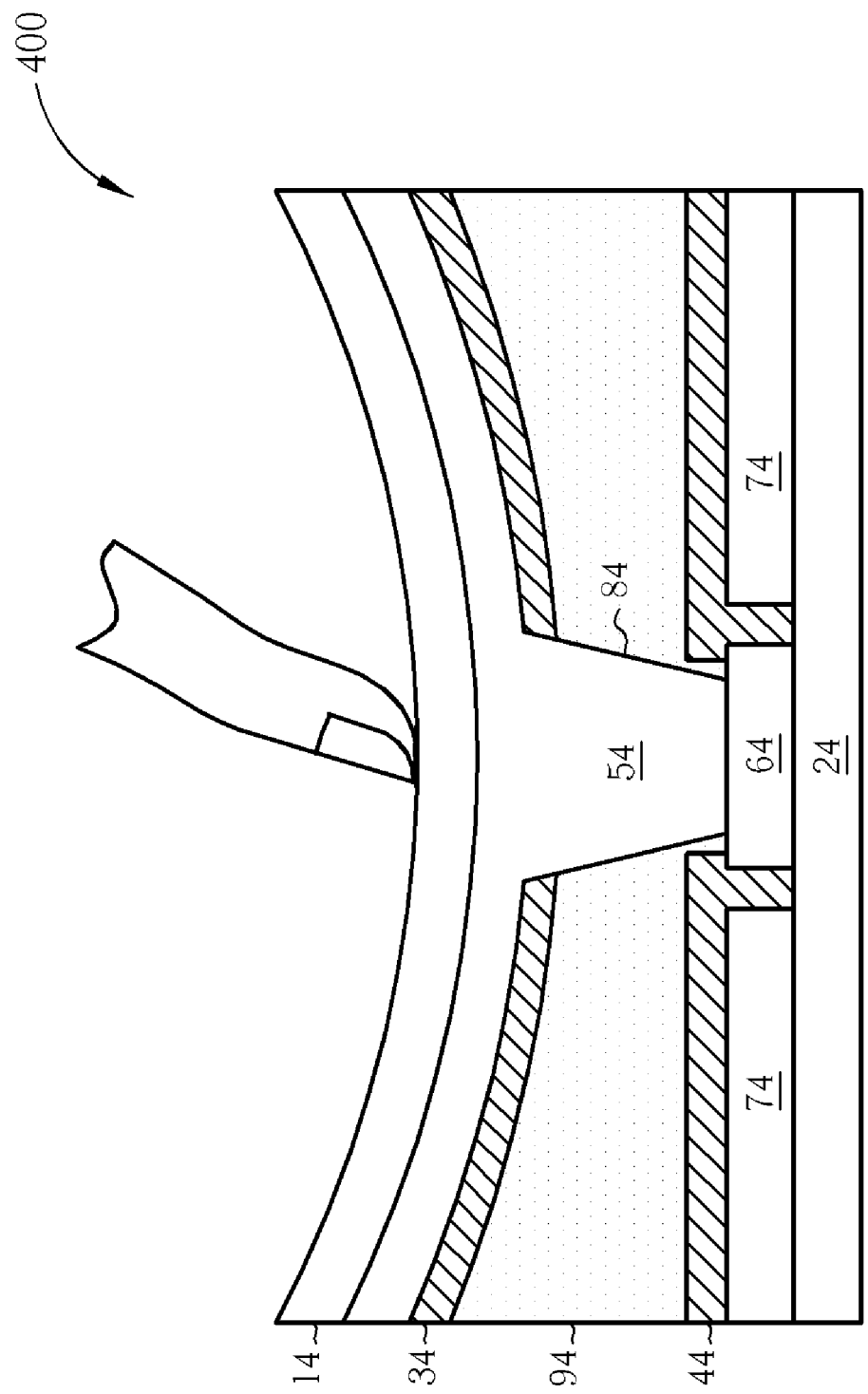
FIG. 13 is a cross-sectional diagram of an LCD device according to the fourth embodiment of the present invention when receiving touch commands.

References are made to FIGS. 12 and 13. FIG. 12 is a cross-sectional diagram illustrating an LCD device 400 according to a fourth embodiment of the present invention when not receiving touch commands. FIG. 13 is a cross-sectional diagram illustrating the LCD device 400 when receiving touch commands. The LCD device 400 includes a first substrate 14, a second substrate 24, a first isolating layer 34, a second isolating layer 44, a first electrode 54, a second electrode 64, a third electrode 74, and a liquid crystal layer 94. The LCD devices 300 and 400 have similar structures. In the LCD device 300 according to the third embodiment of the present invention, the conductor 83 is further disposed on the first electrode 53. In the LCD device 400 according to the fourth embodiment of the present invention, the first electrode 54 includes a protrusive structure 84. In the fourth embodiment of the present invention, the protrusive structure 84 can be formed by etching the first electrode 54. Next, the first isolating layer 34 is disposed on the first electrode 54, followed by removing the first isolating layer 34 formed on the protrusive structure 84. Therefore, the protrusive structure 84 can be in direct contact with the liquid crystal layer 94.

When no touch command is applied for giving instructions or entering data, the first electrode 54 and the second electrode 64 of the LCD device 400 are electrically isolated from each other, as illustrated in FIG. 12. When the user gives instructions or enters data with a touch command, a force is applied to the first substrate 14. The distance between the first substrate 14 and the second substrate 24 is gradually shortened until the protrusive structure 84 of the first electrode 54 is in contact with the contact surface of the second electrode 64. Therefore, the first electrode 54 and the second electrode 64 are electrically connected to each other, as illustrated in FIG. 13.

Figure 14:
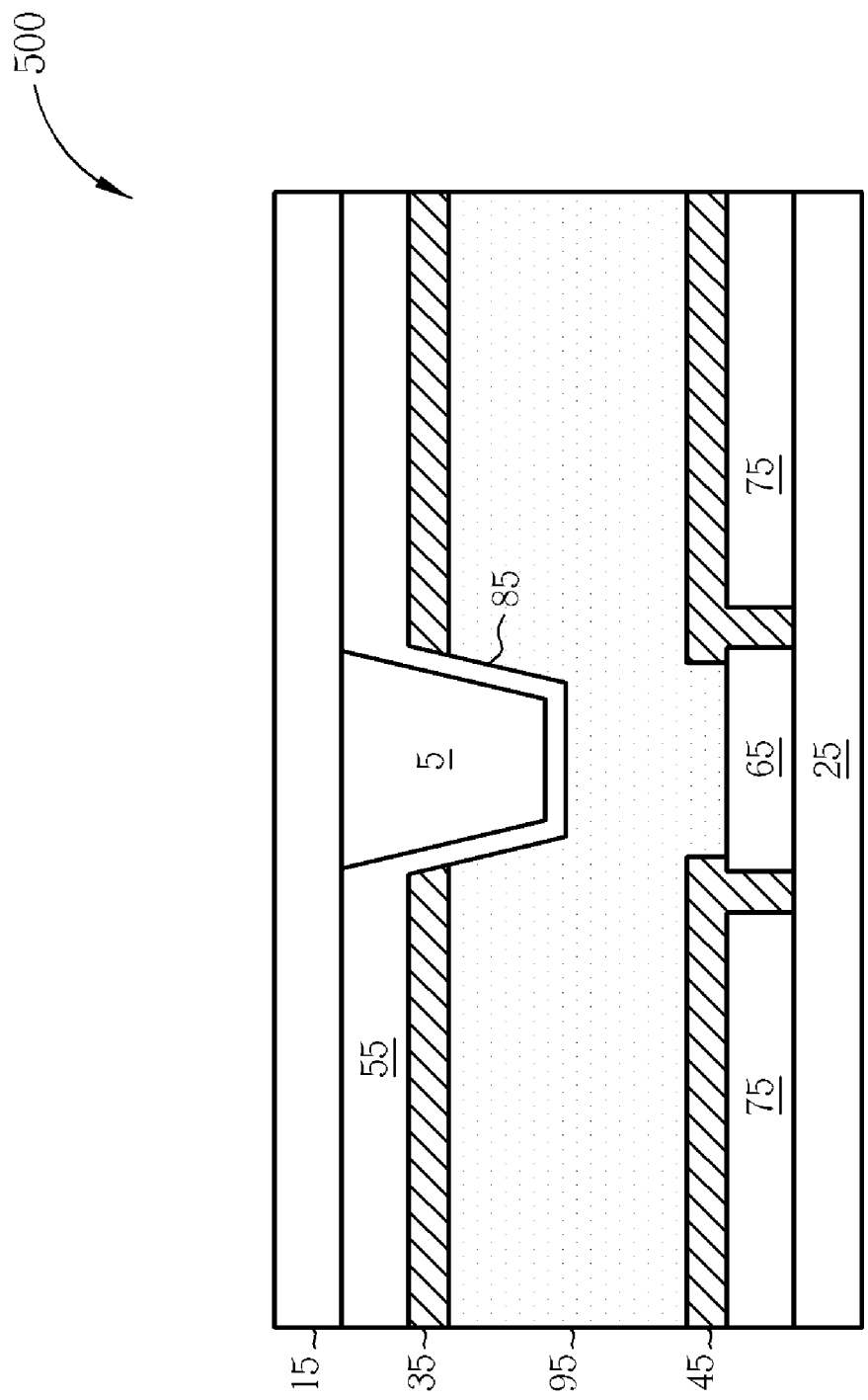
FIG. 14 is a cross-sectional diagram of an LCD device according to a fifth embodiment of the present invention when not receiving touch commands.
Figure 15:
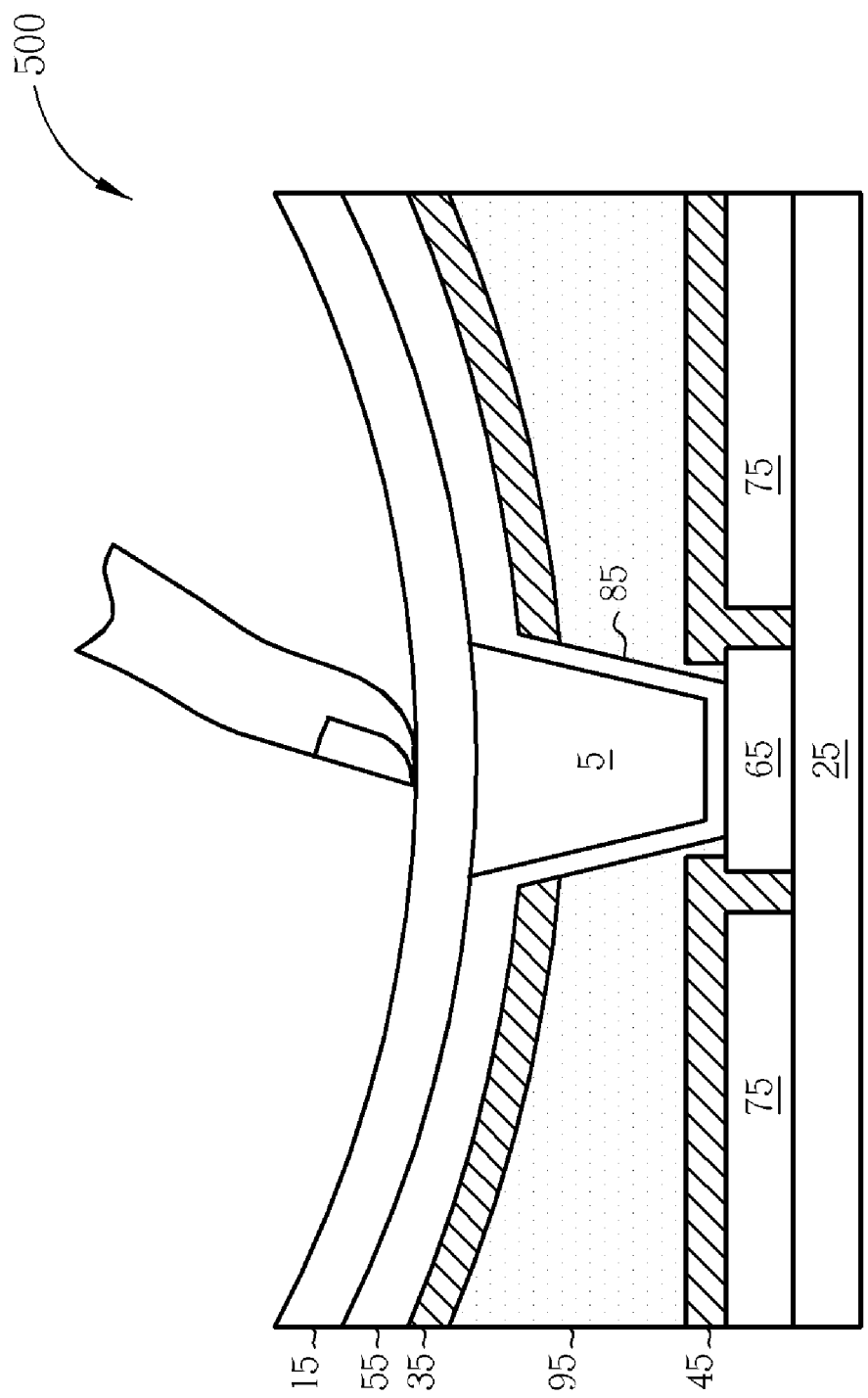
FIG. 15 is a cross-sectional diagram of an LCD device according to the fifth embodiment of the present invention when receiving touch commands.

References are made to FIGS. 14 and 15. FIG. 14 is a cross-sectional diagram illustrating an LCD device 500 according to a fifth embodiment of the present invention when not receiving touch commands. FIG. 15 is a cross-sectional diagram illustrating the LCD device 500 when receiving touch commands. The LCD device 500 includes a first substrate 15, a second substrate 25, a first isolating layer 35, a second isolating layer 45, a first electrode 55, a second electrode 65, a third electrode 75, and a liquid crystal layer 95. The LCD devices 400 and 500 have similar structures. In the LCD device 400 according to the fourth embodiment of the present invention, the first electrode 54 includes a protrusive structure 84. In the LCD device 500 according to the fifth embodiment of the present invention, a spacer 5 is used for defining a protrusive structure 85 of the first electrode 55. In the fifth embodiment of the present invention, the spacer 5 is first disposed on a predetermined location of the first substrate 15 before disposing the first electrode 55. Consequently, the first electrode 55 can include the protrusive structure 85. Next, the first isolating layer 35 is disposed on the first electrode 55, followed by removing the first isolating layer 35 formed on the protrusive structure 85. Therefore, the protrusive structure 85 of the first electrode can be in direct contact with the liquid crystal layer 95.

When no touch command is applied for giving instructions or entering data, the first electrode 55 and the second electrode 65 of the LCD device 500 are electrically isolated from each other, as illustrated in FIG. 14. When the user gives instructions or enters data with a touch command, a force is applied to the first substrate 15. The distance between the first substrate 15 and the second substrate 25 is gradually shortened until the protrusive structure 85 of the first electrode 55 is in contact with the contact surface of the second electrode 65. Therefore, the first electrode 55 and the second electrode 65 are electrically connected to each other, as illustrated in FIG. 15.

Figure 16:
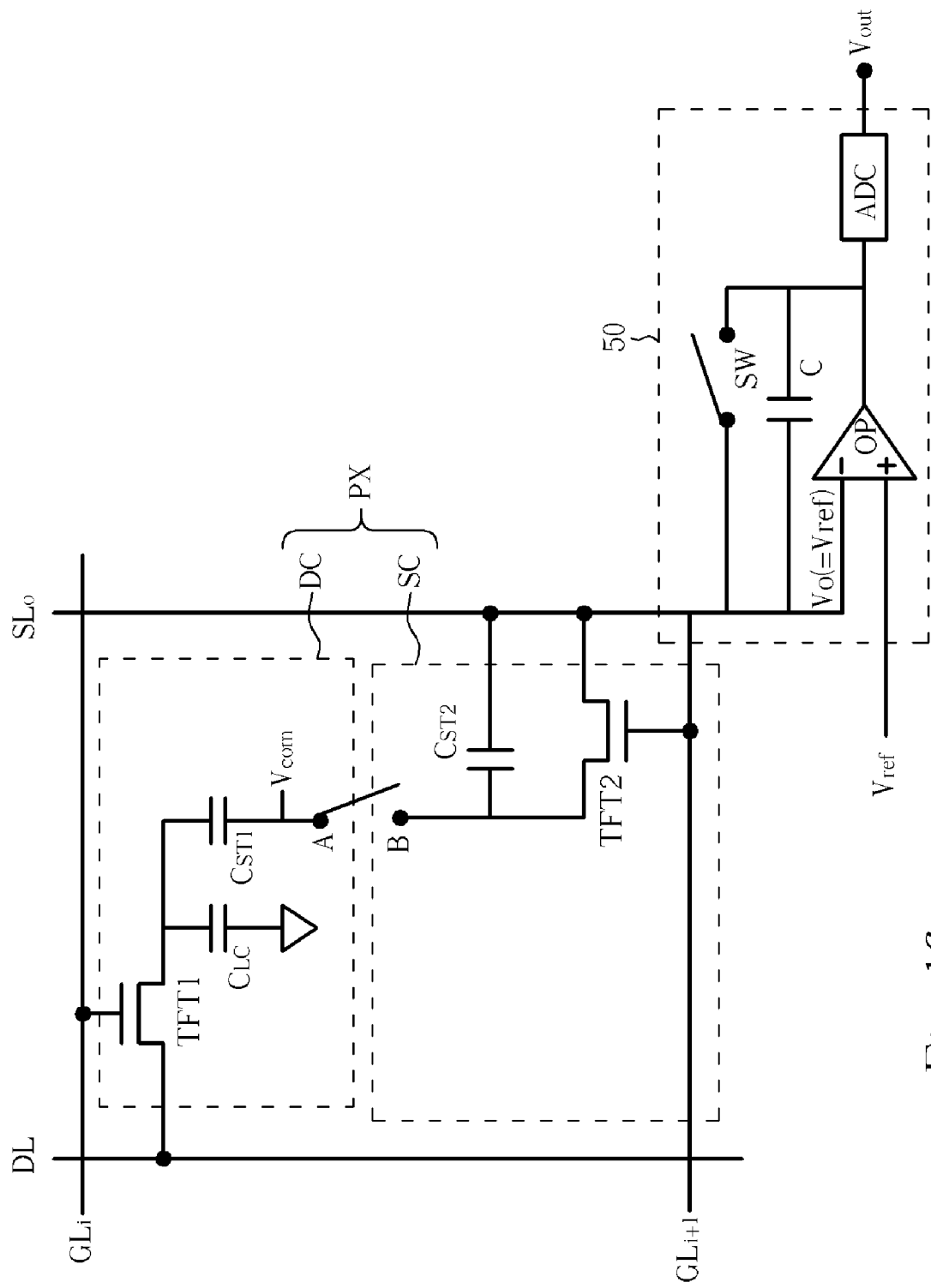
FIG. 16 is an equivalent circuit diagram of the LCD devices in FIGS. 10, 12 and 14.
Figure 17:
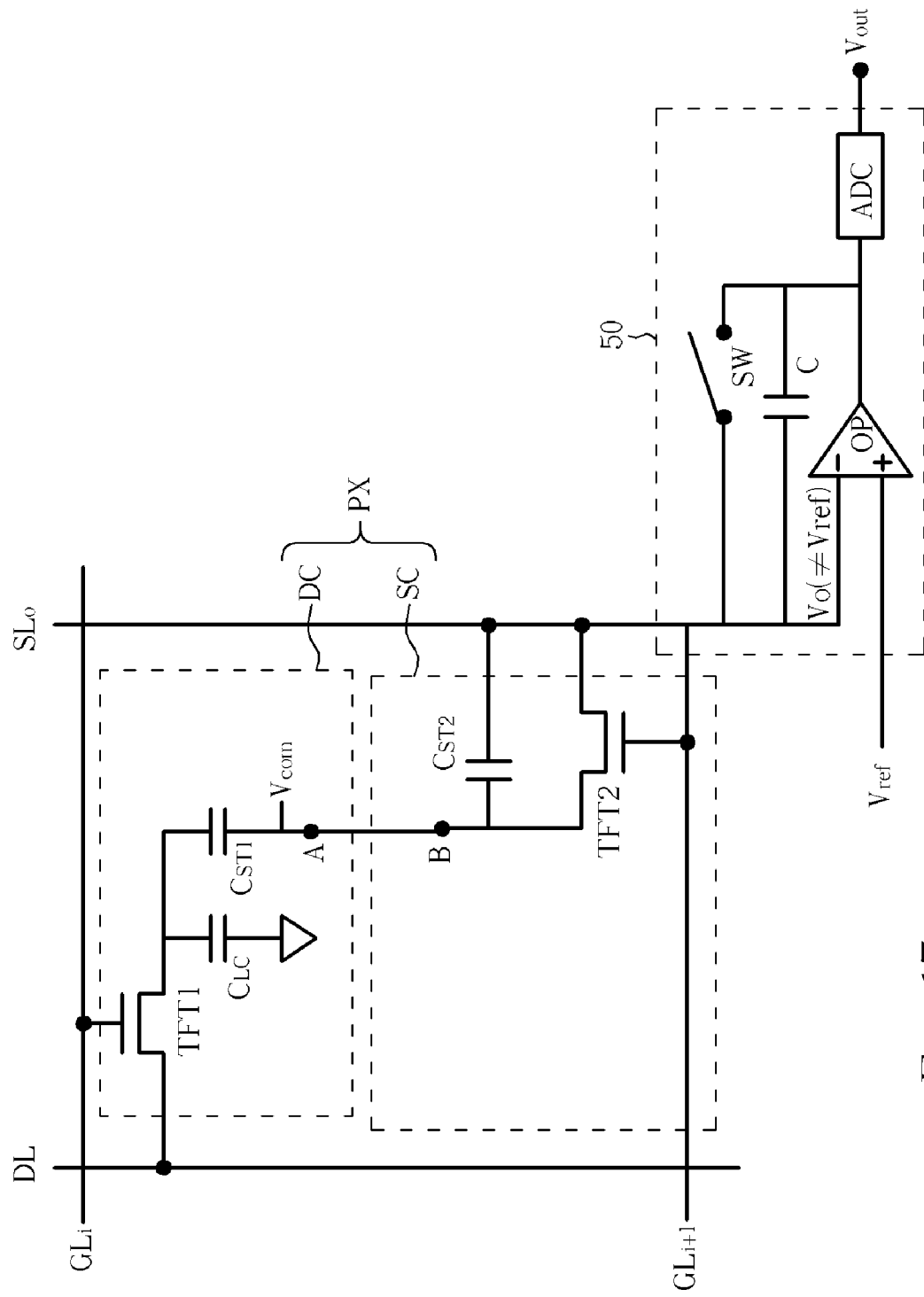
FIG. 17 is an equivalent circuit diagram of the LCD devices in FIGS. 11, 13 and 15.

References are made to FIGS. 16 and 17. FIG. 16 is an equivalent circuit diagram of the LCD devices according to the third through fifth embodiments of the present invention when not receiving touch commands (corresponding to FIGS. 10, 12 and 14). FIG. 17 is an equivalent circuit diagram of the LCD devices according to the third through fifth embodiments of the present invention when receiving touch commands (corresponding to FIGS. 11, 13 and 15). A pixel PX of the LCD device is used for illustrating the present invention in FIGS. 16 and 17. The pixel PX includes a display unit DC and a detecting unit DC. The display unit DC, coupled to a corresponding data line DL and a corresponding gate line $GL_i$, includes a thin film transistor switch TFT1, a liquid crystal capacitor $C_{LC}$ and a storage capacitor $C_{ST1}$. The detecting unit SC, coupled to a sensor signal lines $SL_o$, includes a thin film transistor switch TFT2 and a storage capacitor $C_{ST2}$. A node A corresponds to the conductor 83, the protrusive structure 84 of the first electrode 54, or the protrusive structure 85 of the first electrode 55. A node B corresponds to the second electrode 63, 64 or 65. The LCD device illustrated in FIGS. 16 and 17 further includes an signal processing circuit 50, such as an integrating circuit. The signal processing circuit 50, including devices such as an operational amplifier OP, a capacitor C, a reset switch SW, and an analog-to-digital converter ADC, can generate an output voltage Vout based on the voltages Vo and Vref.

When no touch command is applied, the first electrodes 53-55 are electrically isolated from the second electrodes 63-65 respectively (as illustrated in FIGS. 10, 12 and 14), and the corresponding equivalent circuit diagram of the LCD devices 300, 400 and 500 is illustrated in FIG. 16. Since the node A and the node B are open-circuited, the common voltage $V_{com}$ cannot be transmitted to the storage capacitor $C_{ST2}$. When the thin film transistor switch TFT2 is turned on, the level of the storage capacitor $C_{ST2}$ is kept at the voltage level of Vref. Under these circumstances, signals received at the two input ends of the operational amplifier OP have the same voltage level (Vo=Vref), and the signal processing circuit 50 will not detect any variation in current. When a touch command is applied, the first electrodes 53-55 are electrically connected to the second electrodes 63-65 respectively (as illustrated in FIGS. 11, 13 and 15), and the corresponding equivalent circuit diagram of the LCD devices 300, 400 and 500 is illustrated in FIG. 17. Since the node A and the node B are short-circuited, the common voltage $V_{com}$ can be transmitted to the storage capacitor $C_{ST2}$, thereby changing the level of the storage capacitor $C_{ST2}$. When the thin film transistor switch TFT2 is turned on, the level of the storage capacitor $C_{ST2}$ also varies. Under these circumstances, signals received at the two input ends of the operational amplifier OP have different voltage levels (Vo≠Vref), and the signal processing circuit 50 can measure current variations due to the touch command based on the voltage difference.

Figure 18:
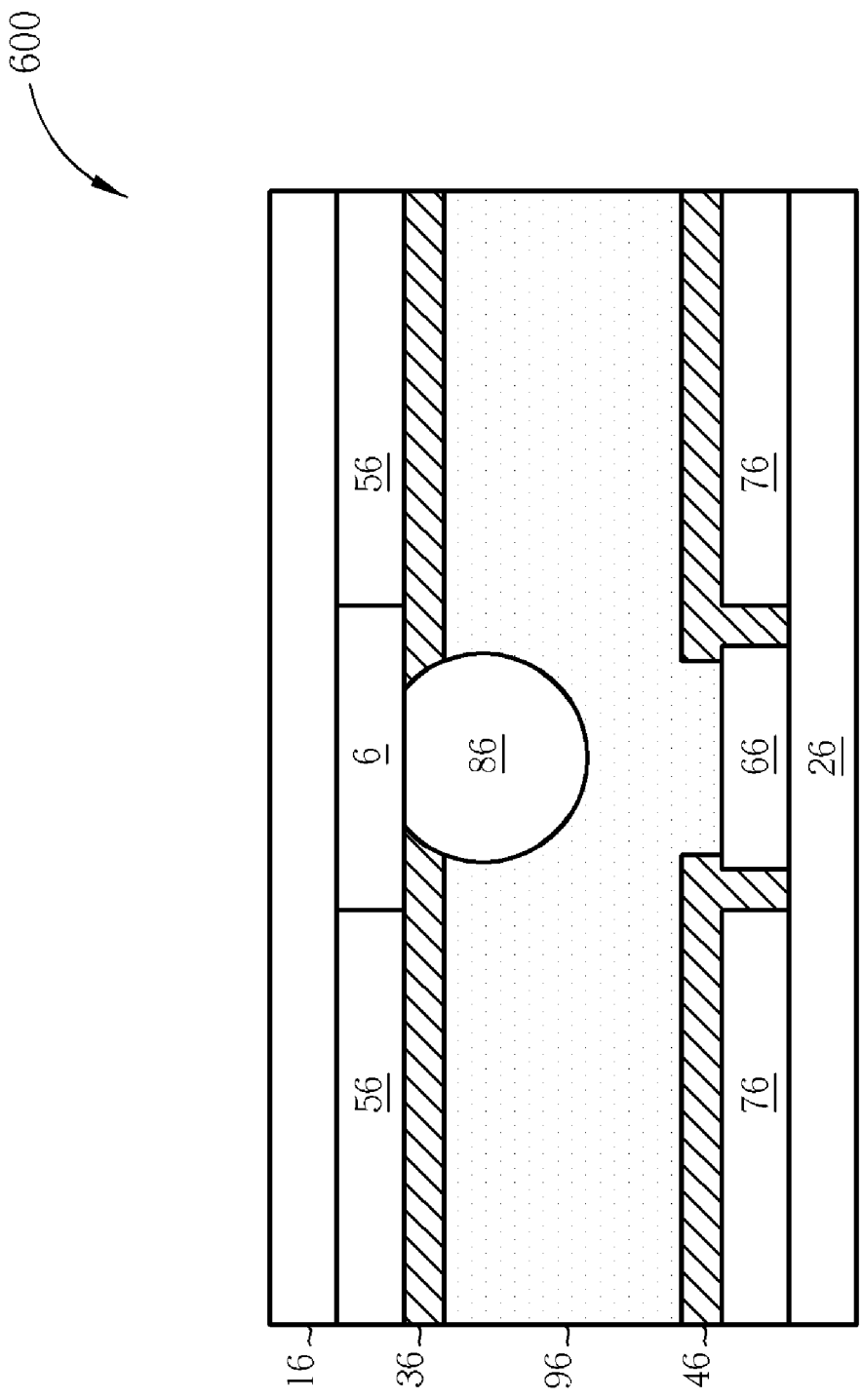
FIG. 18 is a cross-sectional diagram of an LCD device according to a sixth embodiment of the present invention when not receiving touch commands.
Figure 19:
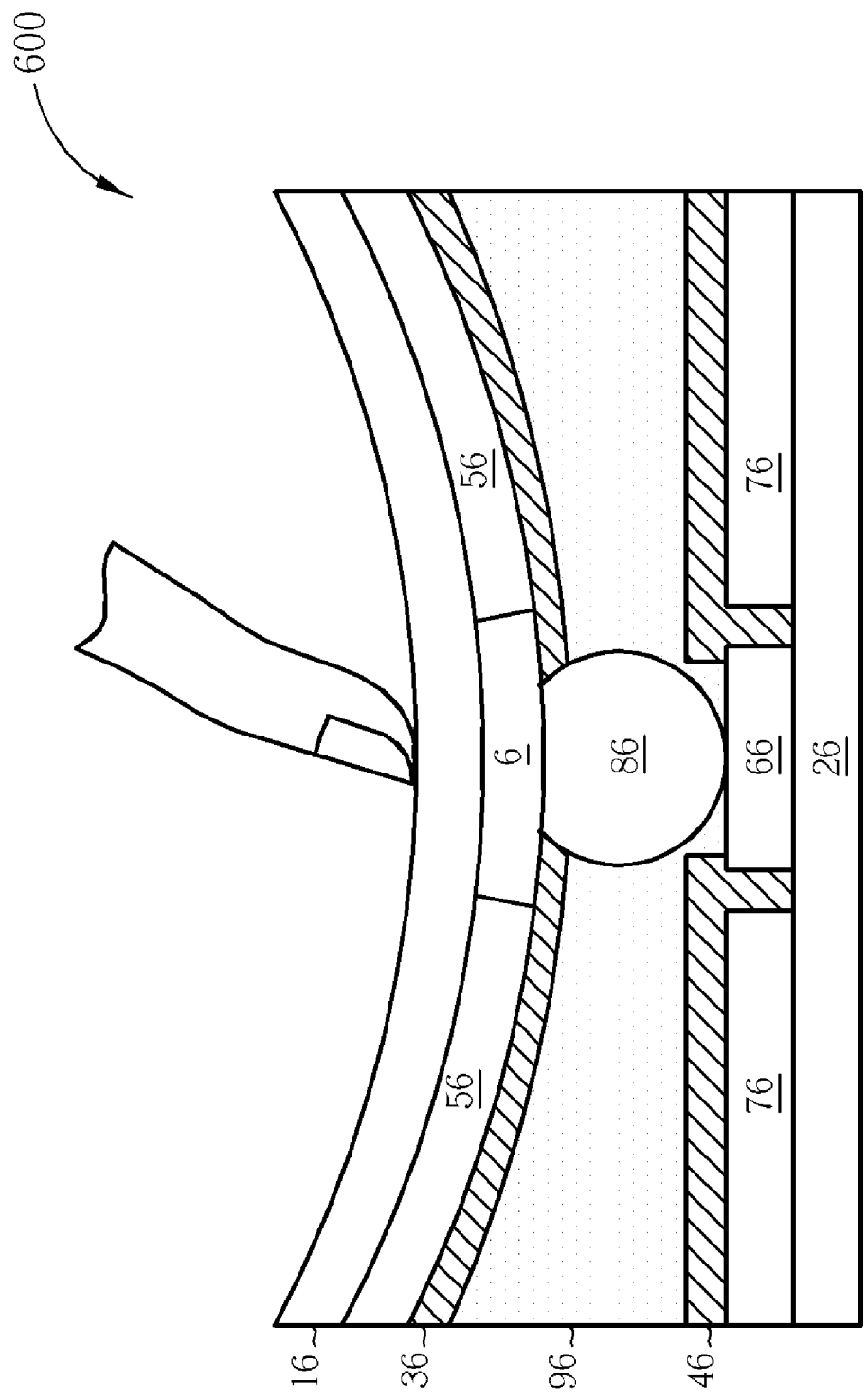
FIG. 19 is a cross-sectional diagram of an LCD device according to the sixth embodiment of the present invention when receiving touch commands.

References are made to FIGS. 18 and 19. FIG. 19 is a cross-sectional diagram illustrating an LCD device 600 according to a sixth embodiment of the present invention when not receiving touch commands. FIG. 19 is a cross-sectional diagram illustrating the LCD device 600 when receiving touch commands. The LCD device 600 includes a first substrate 16, a second substrate 26, a first isolating layer 36, a second isolating layer 46, a first electrode 56, a second electrode 66, a third electrode 76, a conductor 86, a liquid crystal layer 96, and a bias electrode 6. The LCD devices 300 and 600 have similar structures. In the LCD device 300 according to the third embodiment of the present invention, the conductor 83 is disposed on the first electrode 53. In the LCD device 600 according to the sixth embodiment of the present invention, the conductor 83 is disposed on the bias electrode 6 capable of receiving a bias voltage $V_{BIAS}$ having a voltage level different than that of the common voltage. The bias electrode 6 can include ITO or other types of conductive materials.

When no touch command is applied for giving instructions or entering data, the conductor 86 and the second electrode 66 of the LCD device 600 are electrically isolated from each other, as illustrated in FIG. 18. When the user gives instructions or enters data with a touch command, a force is applied to the first substrate 16. The distance between the first substrate 16 and the second substrate 26 is gradually shortened until the conductor 86 is in contact with the contact surface of the second electrode 66. Therefore, the bias electrode 6 and the second electrode 66 are electrically connected to each other, as illustrated in FIG. 19.

Figure 20:
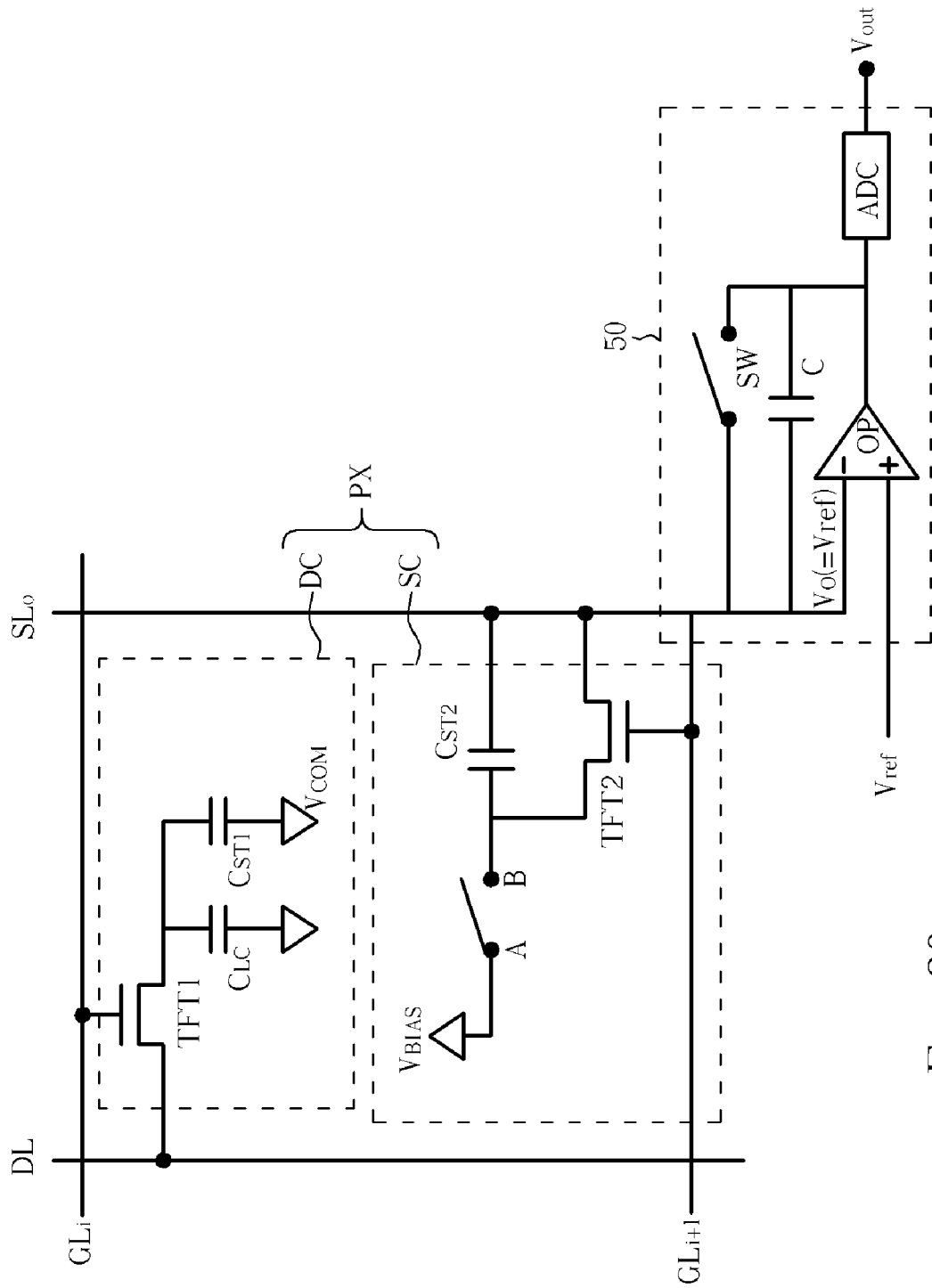
FIG. 20 is an equivalent circuit diagram of the LCD device in FIG. 18.
Figure 21:
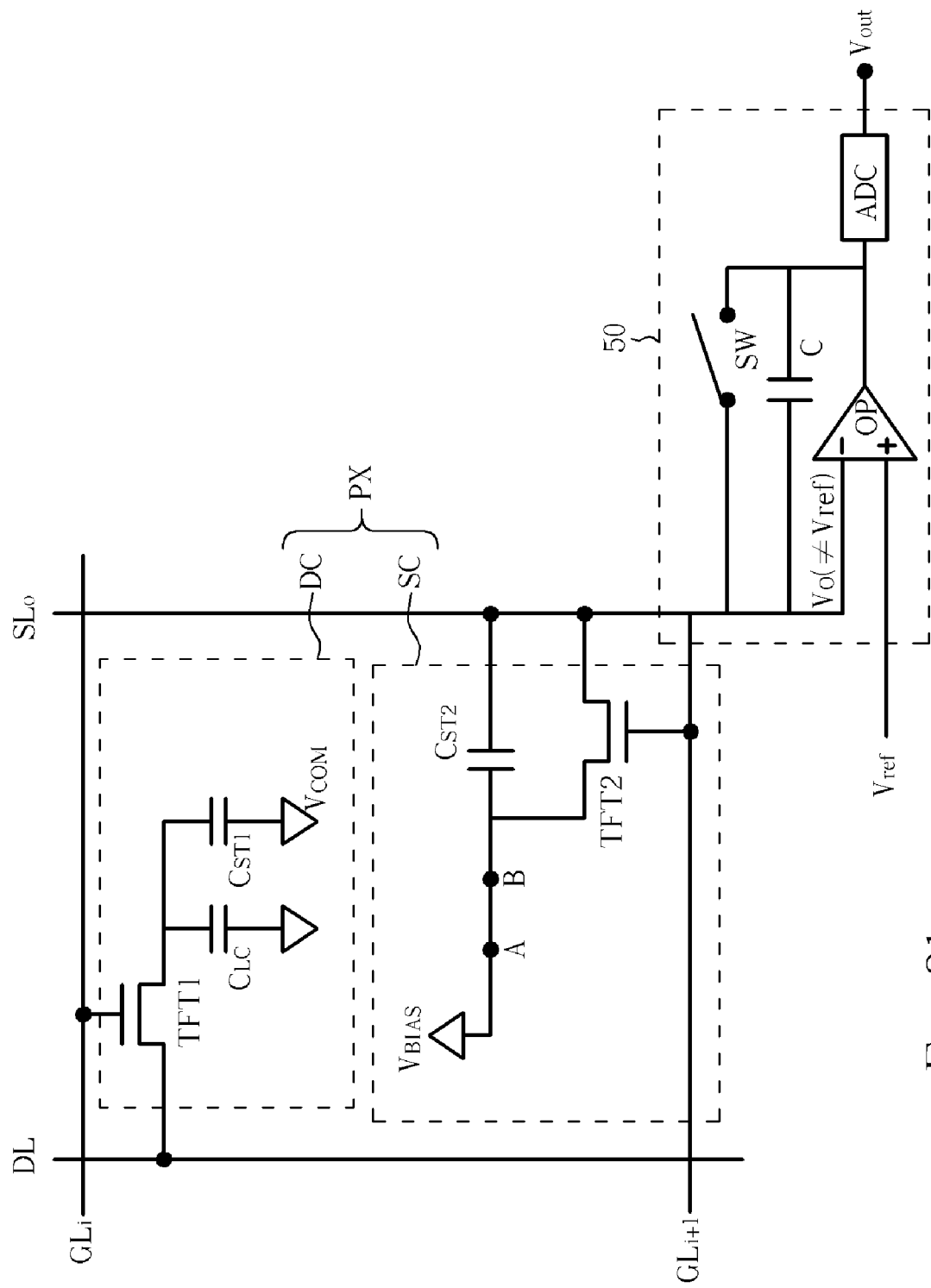
FIG. 21 is an equivalent circuit diagram of the LCD device in FIG. 19.

References are made to FIGS. 20 and 21. FIG. 20 is an equivalent circuit diagram of the LCD device 600 according to the sixth embodiment of the present invention when not receiving touch commands (corresponding to FIG. 18). FIG. 21 is an equivalent circuit diagram of the LCD device 600 when receiving touch commands (corresponding to FIG. 19). A pixel PX of the LCD device 600 is used for illustrating the present invention in FIGS. 20 and 21. The pixel PX includes a display unit DC and a detecting unit DC. The display unit DC, coupled to a corresponding data line DL and a corresponding gate line $GL_i$, includes a thin film transistor switch TFT1, a liquid crystal capacitor $C_{LC}$ and a storage capacitor $C_{ST1}$. The detecting unit SC, coupled to a sensor signal line $SL_o$, includes a thin film transistor switch TFT2 and a storage capacitor $C_{ST2}$. A node A corresponds to the conductor 86, and a node B corresponds to the second electrode 66. The LCD device illustrated in FIGS. 20 and 21 further includes a signal processing circuit 50, such as an integrating circuit. The signal processing circuit 50, including devices such as an operational amplifier OP, a capacitor C, a reset switch SW, and an analog-to-digital converter ADC, can generate an output voltage Vout based on the voltages Vo and Vref.

When no touch command is applied, the bias electrode 6 and the second electrode 66 are electrically isolated (as illustrated in FIG. 18), and the corresponding equivalent circuit diagram of the LCD device 600 is illustrated in FIG. 20. Since the node A and the node B are open-circuited, the voltage $V_{BIAS}$ from the bias electrode 6 cannot be transmitted to the storage capacitor $C_{ST2}$. When the thin film transistor switch TFT2 is turned on, the level of the storage capacitor $C_{ST2}$ is kept at the voltage level of Vref. Under these circumstances, signals received at the two input ends of the operational amplifier OP have the same voltage level (Vo=Vref), and the signal processing circuit 50 will not detect any variation in current. When a touch command is applied, the bias electrode 6 and the second electrode 66 are electrically connected to each other via the conductor 86 (as illustrated in FIG. 19), and the corresponding equivalent circuit diagram of the LCD device 600 is illustrated in FIG. 21. Since the node A and the node B are short-circuited, the voltage $V_{BIAS}$ from the bias electrode 6 can be transmitted to the storage capacitor $C_{ST2}$, thereby changing the level of the storage capacitor $C_{ST2}$. When the thin film transistor switch TFT2 is turned on, the level of the storage capacitor $C_{ST2}$ also varies. Under these circumstances, signals received at the two input ends of the operational amplifier OP have different voltage levels (Vo≠Vref), and the signal processing circuit 50 can measure current variations due to the touch command based on the voltage difference.

In the present invention, the LCD device does not require an extra touch panel for receiving touch commands. Therefore, the present LCD device can reduce manufacturing costs and provide higher display quality. Also, the present invention can accurately identify touch commands based on the conduction between two independent lower electrodes or between an upper electrode and a lower electrode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display (LCD) panel comprising:
a first substrate;
a second substrate, disposed in parallel with the first substrate, facing the first substrate;
a first electrode disposed on the first substrate;
a first isolating layer disposed on the first electrode;
a second electrode disposed on the second substrate and including a first region and a second region;
a third electrode disposed on the second substrate, including a third region and a fourth region, wherein the second region of the second electrode and the third region of the third electrode are separated by a gap;
a second isolating layer disposed on the first region of the second electrode and on the fourth region of the third electrode without overlaying the second region of the second electrode and the third region of the third electrode; and
a conductor disposed on the first isolating layer at a region corresponding to the gap so as to contact the second region of the second electrode and the third region of the third electrode in response to a touch command.

2. The LCD panel of claim 1 further comprising:
a spacer disposed between the conductor and the first isolating layer.

3. The LCD panel of claim 1 further comprising:
a third isolating layer disposed on the second substrate at a region corresponding to the gap.

4. The LCD panel of claim 3 wherein at least one of the first, second and third isolating layers comprises polyimide (PI).

5. The LCD panel of claim 1 wherein at least one of the first, second and third electrodes comprises indium tin oxide (ITO).

6. The LCD panel of claim 1 wherein the conductor comprises copper, gold, or conductive materials.

7. The LCD panel of claim 1 wherein the conductor is ball-shaped.

8. The LCD panel of claim 1 further comprising:
a liquid crystal layer interposed between the first and second substrates.

* * * * *